United States Patent
Tang et al.

(10) Patent No.: US 12,525,898 B2
(45) Date of Patent: Jan. 13, 2026

(54) GRID-TIED INVERTER APPARATUS AND GRID-TIED CONTROL METHOD

(71) Applicant: HUAWEI DIGITAL POWER TECHNOLOGIES CO., LTD., Shenzhen (CN)

(72) Inventors: Yunyu Tang, Shanghai (CN); Lei Shi, Shanghai (CN); Yaojia Zhang, Shanghai (CN); Dong Chen, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 301 days.

(21) Appl. No.: 18/489,576

(22) Filed: Oct. 18, 2023

(65) Prior Publication Data

US 2024/0136948 A1 Apr. 25, 2024
US 2024/0235423 A9 Jul. 11, 2024

(30) Foreign Application Priority Data

Oct. 19, 2022 (CN) .......................... 202211278156.7

(51) Int. Cl.
*H02M 7/538* (2007.01)
*H02M 1/00* (2006.01)
*H02M 7/5387* (2007.01)

(52) U.S. Cl.
CPC ..... *H02M 7/53871* (2013.01); *H02M 1/0054* (2021.05); *H02M 7/53806* (2013.01)

(58) Field of Classification Search
CPC ..................... H02M 7/53806; H02M 7/53871
See application file for complete search history.

(56) References Cited

U.S. PATENT DOCUMENTS

| | | | | |
|---|---|---|---|---|
| 11,116,068 B2 * | 9/2021 | Zhu | ..................... | H02M 3/3376 |
| 2019/0229646 A1 * | 7/2019 | Liu | ................... | H02M 7/53873 |

FOREIGN PATENT DOCUMENTS

| | | |
|---|---|---|
| CN | 103296913 A | 9/2013 |
| CN | 103414327 A | 11/2013 |
| CN | 110021956 A | 7/2019 |
| WO | 2010079235 A2 | 7/2010 |

OTHER PUBLICATIONS

Extended European Search Report in European Appln. No. 23204674.8, mailed on Mar. 18, 2024, 8 pages.

* cited by examiner

*Primary Examiner* — Gary A Nash
(74) *Attorney, Agent, or Firm* — Fish & Richardson P.C.

(57) ABSTRACT

This application describes examples of a grid-tied inverter apparatus and a grid-tied control method. In one example, the grid-tied inverter apparatus includes an inverter circuit, a controller, and a filter circuit. The controller is configured to adjust switching frequencies of a plurality of power switching transistors based on an output current value of the inverter apparatus, to adjust a resonance frequency of the filter circuit through different resonant branches, so that the resonance frequency meets a grid-tied requirement.

20 Claims, 7 Drawing Sheets

GRID-TIED INVERTER APPARATUS AND GRID-TIED CONTROL METHOD

CROSS-REFERENCE TO RELATED APPLICATION

This application claims priority to Chinese Patent Application No. 202211278156.7, filed on Oct. 19, 2022, which is hereby incorporated by reference in its entirety.

TECHNICAL FIELD

This application relates to the field of power electronic technologies, and in particular, to a grid-tied inverter apparatus and a grid-tied control method.

BACKGROUND

In the field of power electronic technologies, an inverter circuit in a power supply system may convert an input voltage provided by an input end (for example, a power supply end) into an output voltage matching an output end (for example, a load end), to supply power to the output end through the input end. Because a switching frequency of an element (for example, a switching transistor) in the inverter circuit is high and a current (or a voltage) output by the inverter circuit includes harmonics, a filter circuit needs to be disposed between the inverter circuit and a load, to filter out, through the filter circuit, the harmonics included in the current (or the voltage) output by the inverter circuit. To maintain system stability, it is usually required that a resonance frequency of the filter circuit be less than a specific grid-tied stabilized frequency (for example, ¼ of switching frequencies of a plurality of power switching transistors). However, in some application scenarios (for example, short-time overload), to meet a power requirement of the load, the inverter circuit needs to reduce the switching frequency to maintain operation of the power supply system. In this case, the resonance frequency of the filter circuit is excessively high, leading to system instability. During research and practice, the inventor of this application finds that, in the conventional technology, an output current of an inverter circuit usually needs to be captured, and feedforward adjustment is performed on an output voltage of the inverter circuit based on the output current of the inverter circuit to adapt to a change of a load. A control process is complex, control time is long, and adaptability is poor.

SUMMARY

This application provides a grid-tied inverter apparatus and a grid-tied control method. When switching frequencies of a plurality of power switching transistors in an inverter circuit are reduced due to overload of a power supply system, resonance may be produced through different resonant branches, to adjust a resonance frequency of a filter circuit in a timely manner, so as to ensure that the resonance frequency of the filter circuit meets a requirement for system stability. A response is fast, and a control method is simple, so that system stability and security are improved, and applicability is high.

According to a first aspect, this application provides a grid-tied inverter apparatus. The inverter apparatus includes an inverter circuit, a controller, and a filter circuit. Herein, the inverter circuit includes a plurality of power switching transistors connected in series or in parallel, the filter circuit includes a plurality of resonant branches that include an inductor unit and a plurality of resonant units connected in parallel, one end of the inverter circuit is connected to a direct current input power supply, another end of the inverter circuit is connected to a power grid or a load through the filter circuit, and the controller is connected to the inverter circuit. The controller herein may adjust switching frequencies of the plurality of power switching transistors based on an output current value of the inverter apparatus, to adjust a resonance frequency of the filter circuit through different resonant branches, so that the resonance frequency meets a grid-tied requirement.

In this application, the controller may obtain (for example, acquire, capture, receive, detect, or store) the output current value of the inverter apparatus. The output current value of the inverter apparatus herein may be an output current value of the inverter circuit, an output current value at a junction (for example, a grid-tied point in a case in which the load is a power grid) between the inverter apparatus and the load, or an output current value of a sampling point. This may be specifically set based on an application scenario. Herein, the controller may adjust the switching frequencies of the plurality of power switching transistors based on the output current value of the inverter apparatus. It can be understood that, in different application scenarios (for example, the inverter apparatus is equivalent to a voltage source in a grid-forming scenario), the controller may control, based on the output current value of the inverter apparatus, the switching frequencies of the plurality of power switching transistors to be different switching frequencies, to adjust output power of the inverter apparatus to adapt to a change of a load end and ensure normal power supply to the load. For example, in a scenario in which a power supply system is overloaded (to be specific, a load increases), the controller may reduce the switching frequencies of the plurality of power switching transistors. During operation of the inverter apparatus, because a switching frequency of an element (for example, a switching transistor) in the inverter circuit is high and a current (or a voltage) output by the inverter circuit includes harmonics, the filter circuit needs to be disposed between the inverter circuit and the load, to filter out, through the filter circuit, the harmonics included in the current (or the voltage) output by the inverter circuit. In a grid-tied scenario, to maintain system stability, it is usually required that the resonance frequency of the filter circuit be less than a specific grid-tied stabilized frequency (for example, ¼ of the switching frequency). Herein, the filter circuit includes the plurality of resonant branches that include the inductor unit and the plurality of resonant units connected in parallel, and the apparatus may further adjust the resonance frequency of the filter circuit through different resonant branches. For example, in the scenario in which the power supply system is overloaded (to be specific, the load increases), the controller may reduce the switching frequencies of the plurality of power switching transistors, to adjust the resonance frequency of the filter circuit through the plurality of resonant units, so as to maintain stability of the power supply system.

With reference to the first aspect, in a first possible implementation, the filter circuit herein is configured to: when the switching frequencies of the plurality of power switching transistors are different, perform resonance through a resonant branch with lowest equivalent impedance among the plurality of resonant branches, to adjust the resonance frequency of the filter circuit. Herein, the controller synchronously changes equivalent impedance in the plurality of resonant branches when adjusting the switching frequencies of the plurality of power switching transistors.

Herein, different resonant branches (for example, a first resonant branch including a capacitor unit and the inductor unit, and a second resonant branch including a variable filter unit and the inductor unit) have different equivalent impedance at different switching frequencies. When the controller adjusts the switching frequencies of the plurality of power switching transistors, a current mainly flows through a resonant branch with lowest equivalent impedance at a current switching frequency, so that the resonant branch currently with the lowest equivalent impedance produces resonance at a resonance frequency corresponding to the current switching frequency. Further, the filter circuit may adjust the resonance frequency of the filter circuit through different resonant branches based on different switching frequencies of the inverter circuit.

In this application, when the switching frequencies of the plurality of power switching transistors in the inverter circuit are reduced due to overload of the power supply system, resonance may be performed through a resonant branch with lowest equivalent impedance among the plurality of resonant branches, to adjust the resonance frequency of the filter circuit in a timely manner. This ensures that the resonance frequency of the filter circuit meets a requirement for system stability, while enhancing a loading capability of the apparatus. A response is fast, and a control method is simple, so that system stability and security are improved, and applicability is high.

With reference to the first possible implementation of the first aspect, in a second possible implementation, the plurality of resonant units may include a capacitor unit and at least one variable filter unit, the inductor unit may include a first inductor unit and a second inductor unit, the first inductor unit and the second inductor unit may be connected in series between the inverter circuit and the load, the capacitor unit and the variable filter unit may be connected in parallel between the first inductor unit and the second inductor unit, the capacitor unit and the inductor unit may constitute a first resonant branch, and the variable filter unit and the inductor unit may constitute a second resonant branch. The controller herein may be further configured to: when the output current value of the inverter apparatus is less than an overload current value, adjust the switching frequencies of the plurality of power switching transistors to a first switching frequency, to adjust the resonance frequency of the filter circuit to a first resonance frequency through the first resonant branch. Herein, when the switching frequency is the first switching frequency, equivalent impedance of the first resonant branch is less than equivalent impedance of the second resonant branch. Herein, the first resonance frequency is less than a first stabilized frequency, and the first stabilized frequency is a grid-tied stabilized frequency corresponding to the first switching frequency (for example, the first stabilized frequency is ¼ of the first switching frequency). It can be understood that, after the controller obtains (for example, acquires, captures, receives, detects, or stores) the output current value of the inverter apparatus, the controller may control the switching frequencies of the plurality of power switching transistors based on the output current value of the inverter apparatus. When the output current value of the inverter apparatus is less than the overload current value, it may indicate that a current load status meets an operation condition of the inverter apparatus (for example, the load is within a rated load range), and the controller may adjust the switching frequencies of the plurality of power switching transistors to the first switching frequency. Herein, the first switching frequency may be a current switching frequency of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency herein may be one frequency value, a plurality of frequency values, a frequency range including a plurality of frequency values, or a plurality of frequency range s including a plurality of frequency values. Herein, among the plurality of resonant branches, the first resonant branch including the capacitor unit and the inductor unit (for example, the first inductor unit and the second inductor unit) has lowest equivalent impedance when the switching frequencies of the plurality of power switching transistors are the first switching frequency, and a current mainly flows through the first resonant branch including the capacitor unit and the inductor unit (for example, the first inductor unit and the second inductor unit), so that the first resonant branch produces resonance at a resonance frequency (namely, the first resonance frequency) corresponding to the first switching frequency. That is, when the output current value of the inverter apparatus is less than the overload current value, the resonance frequency of the filter circuit may be adjusted to the first resonance frequency through the first resonant branch based on the switching frequencies (namely, the first switching frequency) of the plurality of power switching transistors. Herein, the first resonance frequency is less than a first stabilized frequency, and the first stabilized frequency is a grid-tied stabilized frequency corresponding to the first switching frequency (for example, the first stabilized frequency is ¼ of the first switching frequency). In some application scenarios, to meet a requirement for system stability, the first resonance frequency needs to be less than a specific grid-tied stabilized frequency (for example, ¼ of the first switching frequency). It can be understood that a value of the first resonance frequency herein may be determined based on a current resonance frequency of the filter circuit, may be a frequency obtained, for example, acquired, captured, received, detected, or stored, by the controller, may be a rated resonance frequency of the filter circuit, or may be a frequency calculated by the controller based on a current output current value of the inverter apparatus. This may be specifically set based on an application scenario. It can be understood that the first resonance frequency herein may be one frequency value, a plurality of frequency values, a frequency range including a plurality of frequency values, or a plurality of frequency ranges including a plurality of frequency values.

In this application, when the load of the power supply system meets a current operating status of the inverter apparatus, the switching frequencies of the plurality of power switching transistors may be adjusted to the first switching frequency, to adjust the resonance frequency of the filter circuit to the first resonance frequency through the first resonant branch, so as to ensure that the resonance frequency of the filter circuit meets a requirement for system stability. A control method is simple and flexible, and has high applicability.

With reference to the second possible implementation of the first aspect, in a third possible implementation, the controller herein may be further configured to: when the output current value of the inverter apparatus is greater than or equal to the overload current value, reduce the switching frequencies of the plurality of power switching transistors to a second switching frequency, to enhance a loading capability of the inverter apparatus, and adjust the resonance frequency of the filter circuit to a second resonance frequency through the second resonant branch. Herein, the second switching frequency is less than the first switching frequency, and equivalent impedance of the second resonant branch is less than equivalent impedance of the first resonant branch when the switching frequency is the second switching frequency. Herein, the second resonance frequency is less than a second stabilized frequency and less than the first resonance frequency, and the second stabilized frequency is a grid-tied stabilized frequency corresponding to the second switching frequency (for example, the second stabilized frequency is ¼ of the second switching frequency). It can be understood that, after the controller obtains (for example, acquires, captures, receives, detects, or stores) the output current value of the inverter apparatus, the controller may control the switching frequencies of the plurality of power switching transistors based on the output current value of the inverter apparatus. When the output current value of the inverter apparatus is greater than or equal to the overload current value, it may indicate that a current load status does not meet an operation condition of the inverter apparatus (for example, the load increases and is in an overload state), and the controller may reduce the switching frequencies of the plurality of power switching transistors to the second switching frequency. Herein, the second switching frequency is less than the first switching frequency. Herein, the second switching frequency may be a frequency less than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in an overload operating state, or may be a frequency calculated by the controller based on a current output current value of the inverter apparatus. This may be specifically set based on an application scenario. It can be understood that the second switching frequency herein may be one frequency value, a plurality of frequency values, a frequency range including a plurality of frequency values, or a plurality of frequency ranges including a plurality of frequency values. Herein, among the plurality of resonant branches, the second resonant branch including the variable filter unit and the inductor unit (for example, the first inductor unit and the second inductor unit) has lowest equivalent impedance when the switching frequencies of the plurality of power switching transistors are the second switching frequency, and a current mainly flows through the second resonant branch including the variable filter unit and the inductor unit (for example, the first inductor unit and the second inductor unit), so that the second resonant branch produces resonance at a resonance frequency (namely, the second resonance frequency) corresponding to the second switching frequency. That is, when the output current value of the inverter apparatus is greater than or equal to the overload current value, the resonance frequency of the filter circuit may be reduced to the second resonance frequency through the second resonant branch based on the switching frequencies (namely, the second switching frequency) of the plurality of power switching transistors. Herein, the second resonance frequency is less than a second stabilized frequency and less than the first resonance frequency, and the second stabilized frequency is a grid-tied stabilized frequency corresponding to the second switching frequency (for example, the second stabilized frequency is ¼ of the second switching frequency). In a process in which the power supply system is connected to a power grid for grid connection, to meet a requirement for system stability, the second resonance frequency needs to be less than a specific grid-tied stabilized frequency (for example, ¼ of the second switching frequency). It can be understood that a value of the second resonance frequency herein may be determined based on a current resonance frequency of the filter circuit, may be a frequency obtained, for example, acquired, captured, received, detected, or stored, by the controller, may be an overload resonance frequency of the filter circuit, or may be a frequency calculated by the controller based on a current output current value of the inverter apparatus. This may be specifically set based on an application scenario. It can be understood that the second resonance frequency herein may be one frequency value, a plurality of frequency values, a frequency range including a plurality of frequency values, or a plurality of frequency ranges including a plurality of frequency values.

In this application, when the load of the power supply system increases and the inverter apparatus is in an overload operating state, the switching frequencies of the plurality of power switching transistors may be reduced to the second switching frequency, to adjust the resonance frequency of the filter circuit to the second resonance frequency through the second resonant branch, so as to ensure that the resonance frequency of the filter circuit meets a requirement for system stability. A control method is simple and flexible, and has high applicability.

With reference to the third possible implementation of the first aspect, in a fourth possible implementation, the controller herein may be further configured to: when the switching frequencies of the plurality of power switching transistors are the second switching frequency and the output current value of the inverter apparatus is less than a reset current value, increase the switching frequencies of the plurality of power switching transistors to the first switching frequency, to adjust the resonance frequency of the filter circuit to the first resonance frequency through the first resonant branch. Herein, the reset current value is less than or equal to the overload current value. It can be understood that, after the controller controls the switching frequencies of the plurality of power switching transistors to be the second switching frequency, the controller may further obtain (for example, acquire, capture, receive, detect, or store) the output current value of the inverter apparatus, and the controller may further control the switching frequencies of the plurality of power switching transistors based on the output current value of the inverter apparatus. When the switching frequencies of the plurality of power switching transistors are the second switching frequency and the output current value of the inverter apparatus is less than the reset current value, it may indicate that a current load status meets an operation condition of the inverter apparatus again (for example, the load is reduced to be within the rated load range), and the controller may increase the switching frequencies of the plurality of power switching transistors to the first switching frequency. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit is re-increased may be a frequency greater than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency to which the inverter circuit is re-increased herein may be one frequency value, a plurality of frequency values, a frequency range including a plurality of frequency values, or a plurality of frequency ranges including a plurality of frequency values. Correspondingly, when the output current value of the inverter apparatus is less than the reset current value, the resonance frequency of the filter circuit may be re-increased to the first resonance frequency through the first resonant branch based on the switching frequencies (namely, the first switching frequency) of the plurality of power switching transistors. Herein, the first resonance frequency to which the filter circuit is re-increased may be equal to the first resonance frequency obtained before the frequency reduction, or may be a third resonance frequency within a first resonance frequency range, and is not necessarily exactly equal to the first resonance frequency obtained before the frequency reduction. It can be understood that the first resonance frequency to which the filter circuit is re-increased herein may be a frequency obtained, for example, acquired, captured, received, detected, or stored, by the controller, may be an overload resonance frequency of the filter circuit, or may be a frequency calculated by the controller based on a current output current value of the inverter apparatus. This may be specifically set based on an application scenario. It can be understood that the first resonance frequency to which the filter circuit is re-increased herein may be one frequency value, a plurality of frequency values, a frequency range including a plurality of frequency values, or a plurality of frequency ranges including a plurality of frequency values.

In this application, when the load of the power supply system meets a current operating status of the inverter apparatus again, the switching frequencies of the plurality of power switching transistors may be re-increased to the first switching frequency, to adjust the resonance frequency of the filter circuit to the first resonance frequency through the first resonant branch, so as to ensure that the resonance frequency of the filter circuit meets a requirement for system stability. A control method is simple and flexible, and has high applicability, so that power supply efficiency of the system is improved.

With reference to any one of the first aspect or the possible implementations of the first aspect, in a fifth possible implementation, the controller includes a state determining unit and a drive control unit, and the state determining unit is connected to the inverter circuit through the drive control unit. The state determining unit herein may be configured to output a first state signal when the output current value of the inverter apparatus is less than the overload current value. The state determining unit herein may be configured to output a second state signal when the output current value of the inverter apparatus is greater than or equal to the overload current value. The drive control unit herein may control, based on the first state signal, the switching frequencies of the plurality of power switching transistors to be the first switching frequency, or control, based on the second state signal, the switching frequencies of the plurality of power switching transistors to be the second switching frequency. It can be understood that, when the output current value of the inverter apparatus is less than the overload current value, it may indicate that a current load status meets an operation condition of the inverter apparatus (for example, the load is within the rated load range), and the controller herein may output the first state signal to indicate that the inverter circuit is currently in a rated operating state or a rated operating mode, and control the switching frequencies of the plurality of power switching transistors to be the first switching frequency. When the switching frequency is the first switching frequency, the first resonant branch of the plurality of resonant branches in the filter circuit has lowest equivalent impedance, and resonance may be produced through the first resonant branch. In this way, when the inverter circuit is in the rated operating state or the rated operating mode, the resonance frequency of the filter circuit is adjusted to the first resonance frequency through the first resonant branch. Alternatively, the filter circuit may control, based on the indication of the first state signal, a switch (or by using another control method) to turn on the first resonant branch and turn off another resonant branch (for example, the second resonant branch), to produce resonance through the first resonant branch. In this way, when the inverter circuit is in the rated operating state or the rated operating mode, the resonance frequency of the filter circuit is adjusted to the first resonance frequency through the first resonant branch, so that the resonance frequency of the filter circuit meets a grid-tied requirement. In addition, it can be understood that, when the output current value of the inverter apparatus is greater than or equal to the overload current value, it may indicate that a current load status does not meet an operation condition of the inverter apparatus (for example, the load increases and is in an overload state), and the controller may output the second state signal to indicate that the inverter circuit is currently in an overload operating state or an overload operating mode, and control the switching frequencies of the plurality of power switching transistors to be reduced to the second switching frequency. When the switching frequency is the second switching frequency, the second resonant branch of the plurality of resonant branches in the filter circuit has lowest equivalent impedance, and resonance may be produced through the second resonant branch. In this way, when the inverter circuit is in the overload operating state or the overload operating mode, the resonance frequency of the filter circuit is adjusted to the second resonance frequency through the second resonant branch. Alternatively, the filter circuit may control, based on the indication of the second state signal, a switch (or by using another control method) to turn on the second resonant branch and turn off another resonant branch (for example, the first resonant branch), to produce resonance through the second resonant branch. In this way, when the inverter circuit is in the overload operating state or the overload operating mode, the resonance frequency of the filter circuit is adjusted to the second resonance frequency through the second resonant branch, so that the resonance frequency of the filter circuit meets a grid-tied requirement again. Herein, the controller may output, based on the output circuit value of the inverter apparatus, different state signals to indicate a current operating status of the inverter circuit, so as to control the inverter circuit to use different switching frequencies, and adjust the resonance frequency of the filter circuit through different resonant branches. This improves power supply efficiency of the system and reduces a loss while ensuring system stability. A response is fast, and a control method is simple.

With reference to the fifth possible implementation of the first aspect, in a sixth possible implementation, the state determining unit herein may be further configured to output a first reset signal when the switching frequencies of the plurality of power switching transistors are the second switching frequency and the output current value of the inverter apparatus is less than the reset current value. The drive control unit herein may further control, based on the first reset signal, the switching frequencies of the plurality of power switching transistors to be the first switching frequency. It can be understood that, when the output current value of the inverter apparatus is less than the reset current value, it may indicate that a current load status meets an operation condition of the inverter apparatus again (for example, the load is reduced to be within rated load range), and the controller herein may output the first reset signal to indicate that the inverter circuit currently switches from the overload operating state or the overload operating mode back to the rated operating state or the rated operating mode, and control the switching frequencies of the plurality of power switching transistors to be increased to the first switching frequency. When the switching frequency is re-increased to the first switching frequency, the first resonant branch of the plurality of resonant branches in the filter circuit has lowest equivalent impedance, and resonance may be re-produced through the first resonant branch. In this way, when the inverter circuit is in the rated operating state or the rated operating mode again, the resonance frequency of the filter circuit is re-adjusted to the first resonance frequency through the first resonant branch. Alternatively, the filter circuit may control, based on the indication of the first reset signal, a switch (or by using another control method) to turn on the first resonant branch and turn off another resonant branch (for example, the second resonant branch) again, to produce resonance through the first resonant branch. In this way, when the inverter circuit is in the rated operating state or the rated operating mode again, the resonance frequency of the filter circuit is adjusted to the first resonance frequency through the first resonant branch, so that the resonance frequency of the filter circuit meets a grid-tied requirement again, and power supply efficiency is improved. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit is re-increased may be a frequency greater than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency to which the inverter circuit is re-increased herein may be one frequency value, a plurality of frequency values, a frequency range including a plurality of frequency values, or a plurality of frequency ranges including a plurality of frequency values. Herein, when the load of the power supply system meets a current operating status of the inverter apparatus again, the controller may re-increase the switching frequencies of the plurality of power switching transistors to the first switching frequency. This improves power supply efficiency of the system and reduces a loss while ensuring system stability. A response is fast, and a control method is simple.

With reference to the sixth possible implementation of the first aspect, in a seventh possible implementation, the variable filter unit includes a variable capacitor unit and a variable inductor unit, the variable capacitor unit and the variable inductor unit are connected in series, and the capacitor unit, the variable capacitor unit, and the variable inductor unit meet the following formulas:

$$Z11<Z21$$

$$Z12>Z22$$

Herein, Z11 is equivalent impedance of the capacitor unit in a case in which the switching frequency is the first switching frequency, Z21 is equivalent impedance of the variable filter unit in a case in which the switching frequency is the first switching frequency, Z12 is equivalent impedance of the capacitor unit in a case in which the switching frequency is the second switching frequency, and Z22 is equivalent impedance of the variable filter unit in a case in which the switching frequency is the second switching frequency. It can be understood that, when the switching frequency is the first switching frequency, the equivalent impedance Z11 of the capacitor unit is less than the equivalent impedance Z21 of the variable filter unit, an output current of the inverter circuit mainly flows through the first resonant branch including the capacitor unit, the first inductor unit, and the second inductor unit, and the filter circuit performs filtering (for example, through an LCL filter circuit) through the first resonant branch, and produces resonance at the first resonance frequency. When the switching frequency is the second switching frequency, the equivalent impedance Z12 of the capacitor unit is greater than the equivalent impedance Z22 of the variable filter unit, an output current of the inverter circuit mainly flows through the second resonant branch including the variable filter unit, the first inductor unit, and the second inductor unit, and the filter circuit performs filtering (for example, through an LLCL filter circuit) through the second resonant branch, and produces resonance at the second resonance frequency.

In this application, based on the switching frequencies of the plurality of power switching transistors, the filter circuit may produce resonance at different resonance frequencies through different resonant branches, to ensure that the resonance frequency of the filter circuit meets a requirement for system stability. A response is fast, and a control method is simple, so that system stability and security are improved, and applicability is high.

According to a second aspect, this application provides a power supply system. The power supply system may include a power supply and an inverter apparatus. The inverter apparatus includes an inverter circuit, a controller, and a filter circuit. The inverter circuit includes a plurality of power switching transistors connected in series or in parallel. The filter circuit includes a plurality of resonant branches that include an inductor unit and a plurality of resonant units connected in parallel. Herein, one end of the inverter circuit is connected to a direct current power supply, another end of the inverter circuit is connected to a power grid or a load through the filter circuit, and the controller is connected to the inverter circuit.

With reference to the second aspect, in a first possible implementation, the power supply system may further include a transformer, and the power supply may be connected to the inverter apparatus through the transformer.

With reference to the first possible implementation of the second aspect, in a second possible implementation, the power supply system may further include a combiner box, and the transformer may be connected to the inverter apparatus through the combiner box.

With reference to the second possible implementation of the second aspect, in a third possible implementation, the power supply system may further include a direct current bus, the transformer may be connected to the direct current bus through the combiner box, and the direct current bus is connected to the inverter apparatus.

With reference to the third possible implementation of the second aspect, in a fourth possible implementation, the power supply system may further include an on-grid/off-grid wiring apparatus, and the inverter apparatus may be connected to the load through the on-grid/off-grid wiring apparatus.

In this application, functional modules in the power supply system are combined in various and flexible manners to adapt to different power supply environments, so that diversity of application scenarios of the power supply system is improved, and adaptability of the power supply system is enhanced.

According to a third aspect, this application provides a grid-tied control method for an inverter apparatus. The control method is applicable to a grid-tied inverter apparatus. The inverter apparatus includes an inverter circuit, a controller, and a filter circuit. The inverter circuit includes a plurality of power switching transistors connected in series or in parallel. The filter circuit includes a plurality of resonant branches that include an inductor unit and a plurality of resonant units connected in parallel. Herein, one end of the inverter circuit is connected to a direct current power supply, another end of the inverter circuit is connected to a power grid or a load through the filter circuit, and the controller is connected to the inverter circuit. The method includes: detecting an output current value of the inverter apparatus; and adjusting switching frequencies of the plurality of power switching transistors based on the output current value of the inverter apparatus, to adjust a resonance frequency of the filter circuit through different resonant branches, so that the resonance frequency meets a grid-tied requirement.

In this application, the controller may obtain (for example, acquire, capture, receive, detect, or store) the output current value of the inverter apparatus. The output current value of the inverter apparatus herein may be an output current value of the inverter circuit, an output current value at a junction (for example, a grid-tied point in a case in which the load is a power grid) between the inverter apparatus and the load, or an output current value of a sampling point. This may be specifically set based on an application scenario. Herein, the controller may adjust the switching frequencies of the plurality of power switching transistors based on the output current value of the inverter apparatus. It can be understood that, in different application scenarios (for example, the inverter apparatus is equivalent to a voltage source in a grid-forming scenario), the controller may control, based on the output current value of the inverter apparatus, the switching frequencies of the plurality of power switching transistors to be different switching frequencies, to adjust output power of the inverter apparatus to adapt to a change of a load end and ensure normal power supply to the load. For example, in a scenario in which a power supply system is overloaded (to be specific, a load increases), the controller may reduce the switching frequencies of the plurality of power switching transistors. During operation of the inverter apparatus, because a switching frequency of an element (for example, a switching transistor) in the inverter circuit is high and a current (or a voltage) output by the inverter circuit includes harmonics, the filter circuit needs to be disposed between the inverter circuit and the load, to filter out, through the filter circuit, the harmonics included in the current (or the voltage) output by the inverter circuit. In a process in which the power supply system is connected to a power grid for grid connection, to maintain system stability, it is usually required that the resonance frequency of the filter circuit be less than a specific value (for example, ¼ of the switching frequency). Herein, the filter circuit includes the plurality of resonant branches that include the inductor unit and the plurality of resonant units connected in parallel, and the apparatus may further adjust the resonance frequency of the filter circuit through different resonant branches. For example, in the scenario in which the power supply system is overloaded (to be specific, the load increases), the controller may reduce the switching frequencies of the plurality of power switching transistors, to adjust the resonance frequency of the filter circuit through the plurality of resonant units, so as to maintain stability of the power supply system.

With reference to the third aspect, in a first possible implementation, the adjusting switching frequencies of the plurality of power switching transistors based on the output current value of the inverter apparatus, to adjust a resonance frequency of the filter circuit through different resonant branches includes: when the switching frequencies of the plurality of power switching transistors are different, performing resonance through a resonant branch with lowest equivalent impedance among the plurality of resonant branches, to adjust the resonance frequency of the filter circuit. Herein, the controller synchronously changes equivalent impedance in the plurality of resonant branches when adjusting the switching frequencies of the plurality of power switching transistors. Herein, different resonant branches (for example, a first resonant branch including a capacitor unit and the inductor unit, and a second resonant branch including a variable filter unit and the inductor unit) have different equivalent impedance at different switching frequencies. When the controller adjusts the switching frequencies of the plurality of power switching transistors, a current mainly flows through a resonant branch with lowest equivalent impedance at a current switching frequency, so that the resonant branch currently with the lowest equivalent impedance produces resonance at a resonance frequency corresponding to the current switching frequency. Further, the filter circuit may adjust the resonance frequency through different resonant branches based on different switching frequencies of the inverter circuit.

In this application, when the switching frequencies of the plurality of power switching transistors in the inverter circuit are reduced due to overload of the power supply system, resonance may be performed through a resonant branch with lowest equivalent impedance among the plurality of resonant branches, to adjust the resonance frequency of the filter circuit in a timely manner. This ensures that the resonance frequency of the filter circuit meets a requirement for system stability, while enhancing a loading capability of the apparatus. A response is fast, and a control method is simple, so that system stability and security are improved, and applicability is high.

With reference to the first possible implementation of the third aspect, in a second possible implementation, the plurality of resonant units include a capacitor unit and at least one variable filter unit, the inductor unit includes a first inductor unit and a second inductor unit, the first inductor unit and the second inductor unit are connected in series between the inverter circuit and the load, the capacitor unit and the variable filter unit are connected in parallel between the first inductor unit and the second inductor unit, the capacitor unit and the inductor unit constitute a first resonant branch, the variable filter unit and the inductor unit constitute a second resonant branch, and after the detecting an output current value of the inverter apparatus, the method further includes: when the output current value of the inverter apparatus is less than an overload current value, adjusting the switching frequencies of the plurality of power switching transistors to a first switching frequency, to adjust the resonance frequency of the filter circuit to a first resonance frequency through the first resonant branch. Herein, when the switching frequency is the first switching frequency, equivalent impedance of the first resonant branch is less than equivalent impedance of the second resonant branch. Herein, the first resonance frequency is less than a first stabilized frequency, and the first stabilized frequency is a grid-tied stabilized frequency corresponding to the first switching frequency (for example, the first stabilized frequency is ¼ of the first switching frequency).

It can be understood that, after the controller obtains (for example, acquires, captures, receives, detects, or stores) the output current value of the inverter apparatus, the controller may control the switching frequencies of the plurality of power switching transistors based on the output current value of the inverter apparatus. When the output current value of the inverter apparatus is less than the overload current value, it may indicate that a current load status meets an operation condition of the inverter apparatus (for example, the load is within a rated load range), and the controller may adjust the switching frequencies of the plurality of power switching transistors to the first switching frequency. Herein, the first switching frequency may be a current switching frequency of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency herein may be one frequency value, a plurality of frequency values, a frequency range including a plurality of frequency values, or a plurality of frequency ranges including a plurality of frequency values. Herein, among the plurality of resonant branches, the first resonant branch including the capacitor unit and the inductor unit (for example, the first inductor unit and the second inductor unit) has lowest equivalent impedance when the switching frequencies of the plurality of power switching transistors are the first switching frequency, and a current mainly flows through the first resonant branch including the capacitor unit and the inductor unit (for example, the first inductor unit and the second inductor unit), so that the first resonant branch produces resonance at a resonance frequency (namely, the first resonance frequency) corresponding to the first switching frequency. That is, when the output current value of the inverter apparatus is less than the overload current value, the resonance frequency of the filter circuit may be adjusted to the first resonance frequency through the first resonant branch based on the switching frequencies (namely, the first switching frequency) of the plurality of power switching transistors. Herein, the first resonance frequency is less than a first stabilized frequency, and the first stabilized frequency is a grid-tied stabilized frequency corresponding to the first switching frequency (for example, the first stabilized frequency is ¼ of the first switching frequency). In a process in which the power supply system is connected to a power grid for grid connection, to meet a requirement for system stability, the first resonance frequency needs to be less than a specific grid-tied stabilized frequency (for example, ¼ of the first switching frequency). It can be understood that a value of the first resonance frequency herein may be determined based on a current resonance frequency of the filter circuit, may be a frequency obtained, for example, acquired, captured, received, detected, or stored, by the controller, may be a rated resonance frequency of the filter circuit, or may be a frequency calculated by the controller based on a current output current value of the inverter apparatus. This may be specifically set based on an application scenario. It can be understood that the first resonance frequency herein may be one frequency value, a plurality of frequency values, a frequency range including a plurality of frequency values, or a plurality of frequency ranges including a plurality of frequency values.

In this application, when the load of the power supply system meets a current operating status of the inverter apparatus, the switching frequencies of the plurality of power switching transistors may be adjusted to the first switching frequency, to adjust the resonance frequency of the filter circuit to the first resonance frequency through the first resonant branch, so as to ensure that the resonance frequency of the filter circuit meets a requirement for system stability. A control method is simple and flexible, and has high applicability.

With reference to the second possible implementation of the third aspect, in a third possible implementation, after the detecting an output current value of the inverter apparatus, the method further includes: when the output current value of the inverter apparatus is greater than or equal to the overload current value, reducing the switching frequencies of the plurality of power switching transistors to a second switching frequency, to enhance a loading capability of the inverter apparatus, and adjusting the resonance frequency of the filter circuit to a second resonance frequency through the second resonant branch. Herein, the second switching frequency is less than the first switching frequency, and equivalent impedance of the second resonant branch is less than equivalent impedance of the first resonant branch when the switching frequency is the second switching frequency. Herein, the second switching frequency is less than the first switching frequency and less than the first resonance frequency, the second resonance frequency is less than a second stabilized frequency, and the second stabilized frequency is a grid-tied stabilized frequency corresponding to the second switching frequency.

It can be understood that, after the controller obtains (for example, acquires, captures, receives, detects, or stores) the output current value of the inverter apparatus, the controller may control the switching frequencies of the plurality of power switching transistors based on the output current value of the inverter apparatus. When the output current value of the inverter apparatus is greater than or equal to the overload current value, it may indicate that a current load status does not meet an operation condition of the inverter apparatus (for example, the load increases and is in an overload state), and the controller may reduce the switching frequencies of the plurality of power switching transistors to the second switching frequency, to enhance a loading capability of the inverter apparatus, and adjust the resonance frequency of the filter circuit to the second resonance frequency through the second resonant branch. Herein, the second switching frequency is less than the first switching frequency, and equivalent impedance of the second resonant branch is less than equivalent impedance of the first resonant branch when the switching frequency is the second switching frequency. Herein, the second switching frequency may be a frequency less than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in an overload operating state, or may be a frequency calculated by the controller based on a current output current value of the inverter apparatus. This may be specifically set based on an application scenario. It can be understood that the second switching frequency herein may be one frequency value, a plurality of frequency values, a frequency range including a plurality of frequency values, or a plurality of frequency ranges including a plurality of frequency values. Herein, among the plurality of resonant branches, the second resonant branch including the variable filter unit and the inductor unit (for example, the first inductor unit and the second inductor unit) has lowest equivalent impedance when the switching frequencies of the plurality of power switching transistors are the second switching frequency, and a current mainly flows through the second resonant branch including the variable filter unit and the inductor unit (for example, the first inductor unit and the second inductor unit), so that the second resonant branch produces resonance at a resonance frequency (namely, the second resonance frequency) corresponding to the second switching frequency. That is, when the output current value of the inverter apparatus is greater than or equal to the overload current value, the resonance frequency of the filter circuit may be reduced to the second resonance frequency through the second resonant branch based on the switching frequencies (namely, the second switching frequency) of the plurality of power switching transistors. Herein, the second resonance frequency is less than a second stabilized frequency and less than the first resonance frequency, and the second stabilized frequency is a grid-tied stabilized frequency corresponding to the second switching frequency (for example, the second stabilized frequency is ¼ of the second switching frequency). In a process in which the power supply system is connected to a power grid for grid connection, to meet a requirement for system stability, the second resonance frequency needs to be less than a specific grid-tied stabilized frequency (for example, ¼ of the second switching frequency). It can be understood that a value of the second resonance frequency herein may be determined based on a current resonance frequency of the filter circuit, may be a frequency obtained, for example, acquired, captured, received, detected, or stored, by the controller, may be an overload resonance frequency of the filter circuit, or may be a frequency calculated by the controller based on a current output current value of the inverter apparatus. This may be specifically set based on an application scenario. It can be understood that the second resonance frequency herein may be one frequency value, a plurality of frequency values, a frequency range including a plurality of frequency values, or a plurality of frequency ranges including a plurality of frequency values.

In this application, when the load of the power supply system increases and the inverter apparatus is in an overload operating state, the switching frequencies of the plurality of power switching transistors may be reduced to the second switching frequency, to adjust the resonance frequency of the filter circuit to the second resonance frequency through the second resonant branch, so as to ensure that the resonance frequency of the filter circuit meets a requirement for system stability. A control method is simple and flexible, and has high applicability.

With reference to the third possible implementation of the third aspect, in a fourth possible implementation, after the adjusting the resonance frequency of the filter circuit to a second resonance frequency through the variable filter unit, the method further includes: when the output current value of the inverter apparatus is less than a reset current value, increasing the switching frequencies of the plurality of power switching transistors to the first switching frequency, to adjust the resonance frequency of the filter circuit to the first resonance frequency through the first resonant branch. Herein, the reset current value is less than or equal to the overload current value.

It can be understood that, after the controller controls the switching frequencies of the plurality of power switching transistors to be the second switching frequency, the controller may further obtain (for example, acquire, capture, receive, detect, or store) the output current value of the inverter apparatus, and the controller may further control the switching frequencies of the plurality of power switching transistors based on the output current value of the inverter apparatus. When the switching frequencies of the plurality of power switching transistors are the second switching frequency and the output current value of the inverter apparatus is less than the reset current value, it may indicate that a current load status meets an operation condition of the inverter apparatus again (for example, the load is reduced to be within the rated load range), and the controller may increase the switching frequencies of the plurality of power switching transistors to the first switching frequency. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit is re-increased may be a frequency greater than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency to which the inverter circuit is re-increased herein may be one frequency value, a plurality of frequency values, a frequency range including a plurality of frequency values, or a plurality of frequency ranges including a plurality of frequency values. Correspondingly, when the output current value of the inverter apparatus is less than the reset current value, the resonance frequency of the filter circuit may be re-increased to the first resonance frequency through the first resonant branch based on the switching frequencies (namely, the first switching frequency) of the plurality of power switching transistors. Herein, the first resonance frequency to which the filter circuit is re-increased may be equal to the first resonance frequency obtained before the frequency reduction, or may be a third resonance frequency within a first resonance frequency range, and is not necessarily exactly equal to the first resonance frequency obtained before the frequency reduction. It can be understood that the first resonance frequency to which the filter circuit is re-increased herein may be a frequency obtained, for example, acquired, captured, received, detected, or stored, by the controller, may be an overload resonance frequency of the filter circuit, or may be a frequency calculated by the controller based on a current output current value of the inverter apparatus. This may be specifically set based on an application scenario. It can be understood that the first resonance frequency to which the filter circuit is re-increased herein may be one frequency value, a plurality of frequency values, a frequency range including a plurality of frequency values, or a plurality of frequency ranges including a plurality of frequency values.

In this application, when the load of the power supply system meets a current operating status of the inverter apparatus again, the switching frequencies of the plurality of power switching transistors may be re-increased to the first switching frequency, to adjust the resonance frequency of the filter circuit to the first resonance frequency through the first resonant branch, so as to ensure that the resonance frequency of the filter circuit meets a requirement for system stability. A control method is simple and flexible, and has high applicability, so that power supply efficiency of the system is improved.

With reference to any one of the possible implementations of the third aspect, in a fifth possible implementation, the controller includes a state determining unit and a drive control unit, and after the detecting an output current value of the inverter apparatus, the method further includes: outputting a first state signal when the output current value of the inverter apparatus is less than the overload current value; outputting a second state signal when the output current value of the inverter apparatus is greater than or equal to the overload current value; and controlling, based on the first state signal, the switching frequencies of the plurality of power switching transistors to be the first switching frequency, or controlling, based on the second state signal, the switching frequencies of the plurality of power switching transistors to be the second switching frequency. It can be understood that, when the output current value of the inverter apparatus is less than the overload current value, it may indicate that a current load status meets an operation condition of the inverter apparatus (for example, the load is within the rated load range), and the controller herein may output the first state signal to indicate that the inverter circuit is currently in a rated operating state or a rated operating mode, and control the switching frequencies of the plurality of power switching transistors to be the first switching frequency. When the switching frequency is the first switching frequency, the first resonant branch of the plurality of resonant branches in the filter circuit has lowest equivalent impedance. Based on that the first resonant branch has the lowest equivalent impedance at the first switching frequency, the filter circuit may produce resonance through the first resonant branch. In this way, when the inverter circuit is in the rated operating state or the rated operating mode, the resonance frequency of the filter circuit is adjusted to the first resonance frequency through the first resonant branch. Alternatively, the filter circuit may control, based on the indication of the first state signal, a switch (or by using another control method) to turn on the first resonant branch and turn off another resonant branch (for example, the second resonant branch), to produce resonance through the first resonant branch. In this way, when the inverter circuit is in the rated operating state or the rated operating mode, the resonance frequency of the filter circuit is adjusted to the first resonance frequency through the first resonant branch, so that the resonance frequency of the filter circuit meets a grid-tied requirement. In addition, it can be understood that, when the output current value of the inverter apparatus is greater than or equal to the overload current value, it may indicate that a current load status does not meet an operation condition of the inverter apparatus (for example, the load increases and is in an overload state), and the controller may output the second state signal to indicate that the inverter circuit is currently in an overload operating state or an overload operating mode, and control the switching frequencies of the plurality of power switching transistors to be the second switching frequency. When the switching frequency is the second switching frequency, the second resonant branch of the plurality of resonant branches in the filter circuit has lowest equivalent impedance, and resonance may be produced through the second resonant branch. In this way, when the inverter circuit is in the overload operating state or the overload operating mode, the resonance frequency of the filter circuit is adjusted to the second resonance frequency through the second resonant branch. Alternatively, the filter circuit may control, based on the indication of the second state signal, a switch (or by using another control method) to turn on the second resonant branch and turn off another resonant branch (for example, the first resonant branch), to produce resonance through the second resonant branch. In this way, when the inverter circuit is in the overload operating state or the overload operating mode, the resonance frequency of the filter circuit is adjusted to the second resonance frequency through the second resonant branch, so that the resonance frequency of the filter circuit meets a grid-tied requirement again. Herein, the controller may output, based on the output circuit value of the inverter apparatus, different state signals to indicate a current operating status of the inverter circuit, so as to control the inverter circuit to use different switching frequencies, and adjust the resonance frequency of the filter circuit through different resonant branches. This improves power supply efficiency of the system and reduces a loss while ensuring system stability. A response is fast, and a control method is simple.

With reference to the fifth possible implementation of the third aspect, in a sixth possible implementation, after the controlling, based on the second state signal, the switching frequencies of the plurality of power switching transistors to be the second switching frequency, the method further includes: outputting a first reset signal when the output current value of the inverter apparatus is less than the reset current value; and controlling, based on the first reset signal, the switching frequencies of the plurality of power switching transistors to be the first switching frequency. It can be understood that, when the output current value of the inverter apparatus is less than the reset current value, it may indicate that a current load status meets an operation condition of the inverter apparatus again (for example, the load is reduced to be within rated load range), and the controller herein may output the first reset signal to indicate that the inverter circuit currently switches from the overload operating state or the overload operating mode back to the rated operating state or the rated operating mode, and control the switching frequencies of the plurality of power switching transistors to be increased to the first switching frequency. When the switching frequency is re-increased to the first switching frequency, the first resonant branch of the plurality of resonant branches in the filter circuit has lowest equivalent impedance, and resonance may be re-produced through the first resonant branch. In this way, when the inverter circuit is in the rated operating state or the rated operating mode again, the resonance frequency of the filter circuit is re-adjusted to the first resonance frequency through the first resonant branch. Alternatively, the filter circuit may control, based on the indication of the first reset signal, a switch (or by using another control method) to turn on the first resonant branch and turn off another resonant branch (for example, the second resonant branch) again, to produce resonance through the first resonant branch. In this way, when the inverter circuit is in the rated operating state or the rated operating mode again, the resonance frequency of the filter circuit is adjusted to the first resonance frequency through the first resonant branch, so that the resonance frequency of the filter circuit meets a grid-tied requirement again, and power supply efficiency is improved. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit is re-increased may be a frequency greater than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency to which the inverter circuit is re-increased herein may be one frequency value, a plurality of frequency values, a frequency range including a plurality of frequency values, or a plurality of frequency ranges including a plurality of frequency values. Herein, when the load of the power supply system meets a current operating status of the inverter apparatus again, the controller may re-increase the switching frequencies of the plurality of power switching transistors to the first switching frequency. This improves power supply efficiency of the system and reduces a loss while ensuring system stability. A response is fast, and a control method is simple.

DESCRIPTION OF EMBODIMENTS

A grid-tied inverter apparatus provided in this application is applicable to power supply systems in a plurality of application fields, for example, a power supply system in the field of new energy smart microgrids, a power supply system in the field of power transmission and distribution or the field of new energy (for example, the field of grid-tied photovoltaic energy, the field of grid-tied thermal energy, or the field of grid-tied wind energy), a power supply system in the field of photovoltaic power generation, a power supply system in the field of wind power generation, a power supply system in the field of thermal power generation, or a power supply system in the field of high-power converters (for example, a direct current is converted into a high-power alternating current). This may be specifically determined based on an actual application scenario, and is not limited herein. The inverter apparatus provided in this application may adapt to different application scenarios, for example, an application scenario in which power is supplied to a load in a photovoltaic plus storage power supply environment, an application scenario in which power is supplied to a load in a wind plus storage power supply environment, an application scenario in which power is supplied to a load in a pure storage power supply environment, or another application scenario. The application scenario in which power is supplied to a load in a pure storage power supply environment is used below as an example for description, and details are not described below again.

Figure 1:
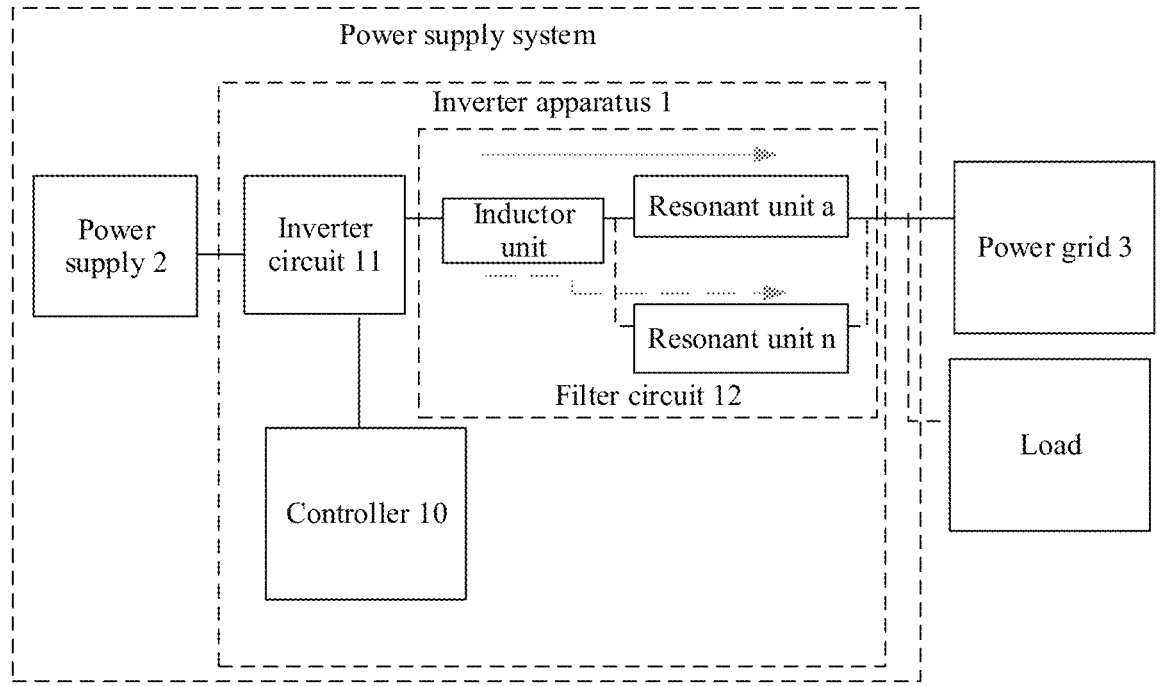
FIG. 1 is a schematic diagram of an application scenario of an inverter apparatus according to an embodiment of this application.

FIG. 1 is a schematic diagram of an application scenario of an inverter apparatus according to an embodiment of this application. In an application scenario of pure storage power supply, as shown in FIG. 1, a power supply system includes an inverter apparatus 1, a power supply 2 (namely, a direct current voltage), and a power grid 3. Herein, two ends of the inverter apparatus 1 are respectively connected to the power supply 2 and the power grid 3. In some feasible implementations, the power supply 2 may supply power to the power grid 3 through the inverter apparatus 1. In some feasible implementations, the power supply 2 may alternatively serve as an energy storage apparatus. When power is sufficient, the power supply 2 may obtain, through the inverter apparatus 1, electric energy provided by the power grid 3 for storage. In this application, only an application scenario in which the power supply 2 supplies power to the power grid 3 through the inverter apparatus 1 is used as an example for description. Details are not described below again. It can be understood that the power supply 2 provided in this application is also applicable to an application scenario in which power is supplied to a plurality of types of electric devices, for example, power is supplied to a load in the power grid 3 or directly to a load, for example, power is supplied to a base station device in a remote region with no mains supply or a poor mains supply, or power is supplied to a battery, or power is supplied to a home device (for example, a refrigerator or an air conditioner). This may be specifically determined based on an actual application scenario, and is not limited herein. Further, it can be understood that the power grid 3 in FIG. 1 may include an electric device or a power transmission device such as a transmission cable, a power transfer station, a battery, a communication base station, or a home device. Herein, the inverter apparatus 1 may include an inverter circuit 11, a controller 10, and a filter circuit 12. One end of the inverter circuit 11 may be connected to the power supply, another end of the inverter circuit 11 may be connected to the power grid 3 through the filter circuit 12, and the controller 10 may be connected to the inverter circuit 11. In some feasible implementations, during operation of the power grid 3, the system may be overloaded due to a change of a load of the power grid 3 (for example, the load of the power grid 3 increases). In this application, the load may be a load of the power grid 3 or a load directly connected to the power supply system. This may be specifically determined based on an application scenario. Herein, only an example in which the load is a load of the power grid 3 is used for description, and details are not described below again. Herein, the controller 10 may obtain (for example, acquire, capture, receive, detect, or store) an output current value of the inverter apparatus 1. The output current value of the inverter apparatus 1 herein may be an output current value of the inverter circuit 11, an output current value at a junction (for example, a grid-tied point) between the inverter apparatus 1 and the power grid 3, or an output current value of a sampling point. This may be specifically set based on an application scenario. It can be understood that, in different application scenarios (for example, the inverter apparatus 1 is equivalent to a voltage source in a grid-forming scenario), the controller 10 may control, based on the output current value of the inverter apparatus 1, switching frequencies of a plurality of power switching transistors in the inverter circuit 11 to be different switching frequencies, to adjust output power of the inverter apparatus 1 to adapt to a change of the power grid 3 and ensure normal power supply to the power grid 3. For example, in a scenario in which the power supply system is overloaded (to be specific, the load of the power grid 3 increases), the controller 10 may reduce the switching frequencies of the plurality of power switching transistors in the inverter circuit 11. Herein, the inverter circuit 11 includes a plurality of power switching transistors connected in series or in parallel. During operation of the inverter apparatus 1, because a switching frequency of an element (for example, a switching transistor) in the inverter circuit 11 is high and a current (or a voltage) output by the inverter circuit 11 includes harmonics, the filter circuit 12 needs to be disposed between the inverter circuit 11 and the power grid 3, to filter out, through the filter circuit 12, the harmonics included in the current (or the voltage) output by the inverter circuit 11. Herein, the filter circuit 12 includes a plurality of resonant branches that include an inductor unit and a plurality of resonant units connected in parallel. In a process in which the power supply system is connected to the power grid for grid connection, to maintain system stability, it is usually required that a resonance frequency of the filter circuit 12 be less than a specific value (for example, a grid-tied stabilized frequency). Herein, when the inverter circuit 11 changes the switching frequencies of the plurality of switching transistors, to ensure system stability (for example, the resonance frequency is less than the grid-tied stabilized frequency in the grid-tied requirement), the filter circuit 12 may further adjust the resonance frequency through different resonant branches. When the switching frequencies of the plurality of power switching transistors are different, the filter circuit 12 herein may perform resonance through a resonant branch with lowest equivalent impedance among the plurality of resonant branches, to adjust the resonance frequency of the filter circuit 12. Herein, the controller synchronously changes equivalent impedance in the plurality of resonant branches when adjusting the switching frequencies of the plurality of power switching transistors. Herein, different resonant branches (for example, a first resonant branch that includes a resonant unit a and the inductor unit and that is indicated by a gray solid line with an arrow in FIG. 1, and a second resonant branch that includes a resonant unit n and the inductor unit and that is indicated by a gray dashed line with an arrow in FIG. 1) have different equivalent impedance at different switching frequencies. When the controller 10 adjusts the switching frequencies of the plurality of power switching transistors, a current mainly flows through a resonant branch with lowest equivalent impedance at a current switching frequency, so that the resonant branch currently with the lowest equivalent impedance produces resonance at a resonance frequency corresponding to the current switching frequency. Further, the filter circuit 12 may adjust the resonance frequency through different resonant branches based on different switching frequencies of the inverter circuit 11. To be specific, in the scenario in which the power supply system is overloaded (to be specific, the load of the power grid 3 increases), the controller 10 may reduce the switching frequencies of the plurality of power switching transistors in the inverter circuit 11, and then the plurality of resonant units may adjust the resonance frequency of the filter circuit 12, so that the resonance frequency of the filter circuit 12 meets a grid-tied requirement, to maintain stability of the power supply system.

In this application, when the switching frequencies of the plurality of power switching transistors in the inverter circuit are reduced due to overload of the power supply system, resonance may be performed through a resonant branch with lowest equivalent impedance among the plurality of resonant branches, to adjust the resonance frequency of the filter circuit in a timely manner. This ensures that the resonance frequency of the filter circuit meets a requirement for system stability in a grid-tied mode, while enhancing a loading capability of the apparatus. A response is fast, and a control method is simple, so that system stability and security are improved, and applicability is high.

With reference to FIG. 2 to FIG. 10, the following describes an inverter apparatus and a power supply system provided in this application and operating principles of the inverter apparatus and the power supply system by using examples.

Figure 2:
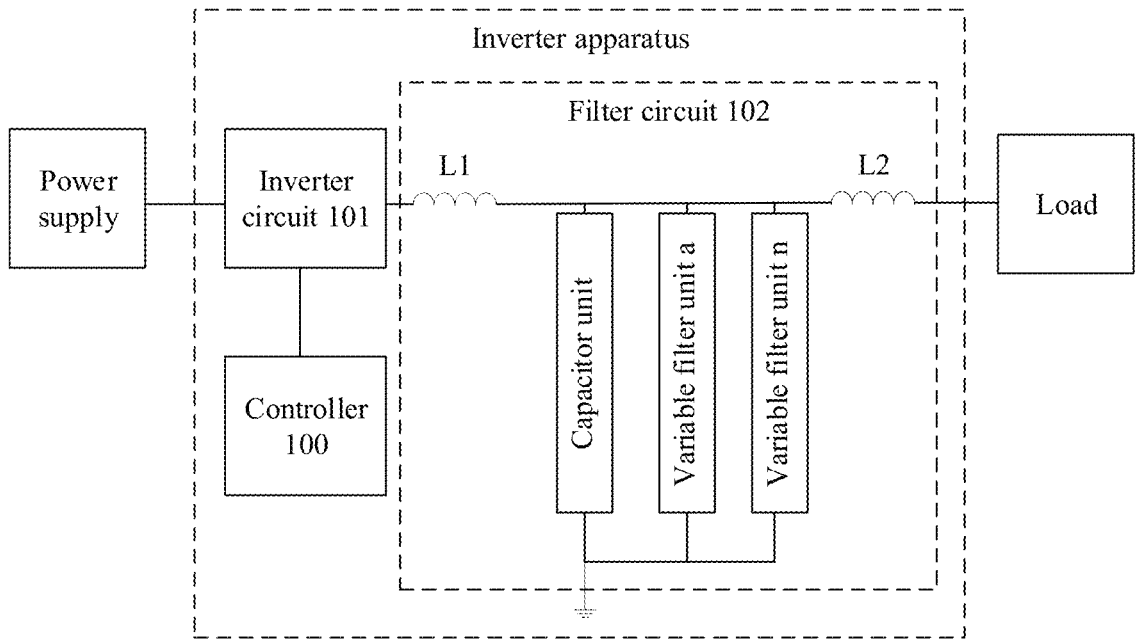
FIG. 2 is a schematic diagram of a structure of an inverter apparatus according to an embodiment of this application.

FIG. 2 is a schematic diagram of a structure of an inverter apparatus according to an embodiment of this application. As shown in FIG. 2, the inverter apparatus includes an inverter circuit 101, a controller 100, and a filter circuit 102. Herein, a plurality of resonant units may include a capacitor unit and at least one variable filter unit (for example, a variable filter unit a to a variable filter unit n), an inductor unit may include a first inductor unit L1 and a second inductor unit L2, the first inductor unit L1 and the second inductor unit L2 may be connected in series between the inverter circuit and a load, the capacitor unit and the variable filter unit (for example, the variable filter unit a to the variable filter unit n) may be connected in parallel between the first inductor unit L1 and the second inductor unit L2, the capacitor unit and the inductor unit may constitute a first resonant branch, and the variable filter unit (for example, the variable filter unit a) and the inductor unit may constitute a second resonant branch. The controller 100 herein may be further configured to: when an output current value of the inverter apparatus is less than an overload current value, adjust switching frequencies of a plurality of power switching transistors in the inverter circuit 101 to a first switching frequency, to adjust a resonance frequency of the filter circuit 102 to a first resonance frequency through the first resonant branch. Herein, when the switching frequency is the first switching frequency, equivalent impedance of the first resonant branch is less than equivalent impedance of the second resonant branch. Herein, the first resonance frequency is less than a first stabilized frequency, and the first stabilized frequency is a grid-tied stabilized frequency corresponding to the first switching frequency (for example, the first stabilized frequency is ¼ of the first switching frequency). It can be understood that, after the controller 100 obtains (for example, acquires, captures, receives, detects, or stores) the output current value of the inverter apparatus, the controller 100 may control the switching frequencies of the plurality of power switching transistors in the inverter circuit 101 based on the output current value of the inverter apparatus. When the output current value of the inverter apparatus is less than the overload current value, it may indicate that a current load status meets an operation condition of the inverter apparatus (for example, the load is within a rated load range), and the controller 100 may adjust the switching frequencies of the plurality of power switching transistors in the inverter circuit 101 to the first switching frequency. Herein, the first switching frequency may be a current switching frequency of the inverter circuit 101, may be a frequency obtained, for example, acquired, captured, received, detected, or stored, by the controller 100, may be switching frequencies of the plurality of power switching transistors in the inverter circuit 101 in a rated operating state, or may be a frequency calculated by the controller 100 based on a current output current value of the inverter apparatus. This may be specifically set based on an application scenario. It can be understood that the first switching frequency herein may be one frequency value, a plurality of frequency values, a frequency range including a plurality of frequency values, or a plurality of frequency ranges including a plurality of frequency values. Herein, among the plurality of resonant branches, the first resonant branch including the capacitor unit and the inductor unit (for example, the first inductor unit L1 and the second inductor unit L2) has lowest equivalent impedance when the switching frequencies of the plurality of power switching transistors are the first switching frequency, and a current mainly flows through the first resonant branch including the capacitor unit and the inductor unit (for example, the first inductor unit L1 and the second inductor unit L2), so that the first resonant branch produces resonance at a resonance frequency (namely, the first resonance frequency) corresponding to the first switching frequency. That is, when the output current value of the inverter apparatus is less than the overload current value, the resonance frequency of the filter circuit 102 may be adjusted to the first resonance frequency through the first resonant branch. Herein, the first resonance frequency is less than a first stabilized frequency, and the first stabilized frequency is a grid-tied stabilized frequency corresponding to the first switching frequency (for example, the first stabilized frequency is ¼ of the first switching frequency). In a process in which a power supply system is connected to a power grid for grid connection, to meet a requirement for system stability, the first resonance frequency needs to be less than a specific grid-tied stabilized frequency (for example, ¼ of the first switching frequency). It can be understood that a value of the first resonance frequency herein may be determined based on a current resonance frequency of the filter circuit 102, may be a frequency obtained, for example, acquired, captured, received, detected, or stored, by the controller 100, may be a rated resonance frequency of the filter circuit 102, or may be a frequency calculated by the controller 100 based on a current output current value of the inverter apparatus. This may be specifically set based on an application scenario. It can be understood that the first resonance frequency herein may be one frequency value, a plurality of frequency values, a frequency range including a plurality of frequency values, or a plurality of frequency ranges including a plurality of frequency values.

In this application, when a load of the power supply system meets a current operating status of the inverter apparatus, the switching frequencies of the plurality of power switching transistors in the inverter circuit 101 may be adjusted to the first switching frequency, to adjust the resonance frequency of the filter circuit 102 to the first resonance frequency through the first resonant branch, so as to ensure that the resonance frequency of the filter circuit 102 meets a requirement for system stability. A control method is simple and flexible, and has high applicability.

In some feasible implementations, the controller 100 herein may be further configured to: when the output current value of the inverter apparatus is greater than or equal to the overload current value, reduce the switching frequencies of the plurality of power switching transistors in the inverter circuit 101 to a second switching frequency, to enhance a loading capability of the inverter apparatus, and adjust the resonance frequency of the filter circuit 102 to a second resonance frequency through the second resonant branch. Herein, the second switching frequency is less than the first switching frequency, and equivalent impedance of the second resonant branch is less than equivalent impedance of the first resonant branch when the switching frequency is the second switching frequency. Herein, the second resonance frequency is less than a second stabilized frequency and less than the first resonance frequency, and the second stabilized frequency is a grid-tied stabilized frequency corresponding to the second switching frequency (for example, the second stabilized frequency is ¼ of the second switching frequency). It can be understood that, after the controller 100 obtains (for example, acquires, captures, receives, detects, or stores) the output current value of the inverter apparatus, the controller 100 may control the switching frequencies of the plurality of power switching transistors in the inverter circuit 101 based on the output current value of the inverter apparatus. When the output current value of the inverter apparatus is greater than or equal to the overload current value, it may indicate that a current load status does not meet an operation condition of the inverter apparatus (for example, the load increases and is in an overload state), and the controller 100 may reduce the switching frequencies of the plurality of power switching transistors in the inverter circuit 101 to the second switching frequency. Herein, the second switching frequency is less than the first switching frequency. Herein, the second switching frequency may be a frequency less than a current switching frequency (for example, the second switching frequency) of the inverter circuit 101, may be a frequency obtained, for example, acquired, captured, received, detected, or stored, by the controller 100, may be switching frequencies of the plurality of power switching transistors in the inverter circuit 101 in an overload operating state, or may be a frequency calculated by the controller 100 based on a current output current value of the inverter apparatus. This may be specifically set based on an application scenario. It can be understood that the second switching frequency herein may be one frequency value, a plurality of frequency values, a frequency range including a plurality of frequency values, or a plurality of frequency ranges including a plurality of frequency values. Herein, among the plurality of resonant branches, the second resonant branch including the variable filter unit (for example, the variable filter unit a) and the inductor unit (for example, the first inductor unit L1 and the second inductor unit L2) has lowest equivalent impedance when the switching frequencies of the plurality of power switching transistors are the second switching frequency, and a current mainly flows through the second resonant branch including the variable filter unit a and the inductor unit (for example, the first inductor unit L1 and the second inductor unit L2), so that the second resonant branch produces resonance at a resonance frequency (namely, the second resonance frequency) corresponding to the second switching frequency. That is, when the output current value of the inverter apparatus is greater than or equal to the overload current value, the resonance frequency of the filter circuit 102 may be reduced to the second resonance frequency through the second resonant branch based on the switching frequencies (namely, the second switching frequency) of the plurality of power switching transistors in the inverter circuit 101. Herein, the second resonance frequency is less than a second stabilized frequency and less than the first resonance frequency, and the second stabilized frequency is a grid-tied stabilized frequency corresponding to the second switching frequency (for example, the second stabilized frequency is ¼ of the second switching frequency). In a process in which the power supply system is connected to a power grid for grid connection, to meet a requirement for system stability, the second resonance frequency needs to be less than a specific grid-tied stabilized frequency (for example, ¼ of the second switching frequency). It can be understood that a value of the second resonance frequency herein may be determined based on a current resonance frequency of the filter circuit 102, may be a frequency obtained, for example, acquired, captured, received, detected, or stored, by the controller 100, may be an overload resonance frequency of the filter circuit 102, or may be a frequency calculated by the controller 100 based on a current output current value of the inverter apparatus. This may be specifically set based on an application scenario. It can be understood that the second resonance frequency herein may be one frequency value, a plurality of frequency values, a frequency range including a plurality of frequency values, or a plurality of frequency ranges including a plurality of frequency values.

In this application, when the load of the power supply system increases and the inverter apparatus is in an overload operating state, the switching frequencies of the plurality of power switching transistors in the inverter circuit 101 may be reduced to the second switching frequency, to adjust the resonance frequency of the filter circuit 102 to the second resonance frequency through the second resonant branch based on the switching frequencies of the plurality of power switching transistors in the inverter circuit 101, so as to ensure that the resonance frequency of the filter circuit 102 meets a requirement for system stability. A control method is simple and flexible, and has high applicability.

In some feasible implementations, the controller 100 herein may be further configured to: when the switching frequencies of the plurality of power switching transistors in the inverter circuit 101 are the second switching frequency and the output current value of the inverter apparatus is less than a reset current value, increase the switching frequencies of the plurality of power switching transistors in the inverter circuit 101 to the first switching frequency, to adjust the resonance frequency of the filter circuit 102 to the first resonance frequency through the first resonant branch based on the switching frequencies of the plurality of power switching transistors in the inverter circuit 101. Herein, the reset current value is less than or equal to the overload current value. It can be understood that, after the controller 100 controls the switching frequencies of the plurality of power switching transistors in the inverter circuit 101 to be the second switching frequency, the controller 100 may further obtain (for example, acquire, capture, receive, detect, or store) the output current value of the inverter apparatus, and the controller 100 may further control the switching frequencies of the plurality of power switching transistors in the inverter circuit 101 based on the output current value of the inverter apparatus. When the switching frequencies of the plurality of power switching transistors in the inverter circuit 101 are the second switching frequency and the output current value of the inverter apparatus is less than the reset current value, it may indicate that a current load status meets an operation condition of the inverter apparatus again (for example, the load is reduced to be within the rated load range), and the controller 100 may increase the switching frequencies of the plurality of power switching transistors in the inverter circuit 101 to the first switching frequency. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit 101 is re-increased may be a frequency greater than a current switching frequency (for example, the second switching frequency) of the inverter circuit 101, may be a frequency obtained, for example, acquired, captured, received, detected, or stored, by the controller 100, may be switching frequencies of the plurality of power switching transistors in the inverter circuit 101 in a rated state, or may be a frequency calculated by the controller 100 based on a current output current value of the inverter apparatus. This may be specifically set based on an application scenario. It can be understood that the first switching frequency to which the inverter circuit 101 is re-increased herein may be one frequency value, a plurality of frequency values, a frequency range including a plurality of frequency values, or a plurality of frequency ranges including a plurality of frequency values. Correspondingly, when the output current value of the inverter apparatus is less than the reset current value, the resonance frequency of the filter circuit 102 may be re-increased to the first resonance frequency through the first resonant branch based on the switching frequencies (namely, the first switching frequency) of the plurality of power switching transistors in the inverter circuit 101. Herein, the first resonance frequency to which the filter circuit 102 is re-increased may be equal to the first resonance frequency obtained before the frequency reduction, or may be a third resonance frequency within a first resonance frequency range, and is not necessarily exactly equal to the first resonance frequency obtained before the frequency reduction. It can be understood that the first resonance frequency to which the filter circuit 102 is re-increased herein may be a frequency obtained, for example, acquired, captured, received, detected, or stored, by the controller 100, may be an overload resonance frequency of the filter circuit 102, or may be a frequency calculated by the controller 100 based on a current output current value of the inverter apparatus. This may be specifically set based on an application scenario. It can be understood that the first resonance frequency to which the filter circuit 102 is re-increased herein may be one frequency value, a plurality of frequency values, a frequency range including a plurality of frequency values, or a plurality of frequency ranges including a plurality of frequency values.

In this application, when the load of the power supply system meets a current operating status of the inverter apparatus again, the switching frequencies of the plurality of power switching transistors in the inverter circuit 101 may be re-increased to the first switching frequency, to adjust the resonance frequency of the filter circuit 102 to the first resonance frequency through the first resonant branch based on the switching frequencies of the plurality of power switching transistors in the inverter circuit 101, so as to ensure that the resonance frequency of the filter circuit 102 meets a requirement for system stability. A control method is simple and flexible, and has high applicability, so that power supply efficiency of the system is improved.

Still as shown in FIG. 2, in some feasible implementations, when the load further increases, the controller 100 may further reduce the switching frequencies of the plurality of power switching transistors in the inverter circuit 101. When the switching frequencies of the plurality of power switching transistors in the inverter circuit 101 are a fourth switching frequency (herein, the fourth switching frequency is less than the second switching frequency), the filter circuit 102 may produce resonance at a fourth resonance frequency (herein, the fourth resonance frequency is less than the second resonance frequency) by using (by controlling a switch, by controlling a selector, based on different impedance or capacitive reactance of units, or in another manner) another resonant branch (for example, a third resonant branch) that includes the variable filter unit (for example, the variable filter unit n), the first inductor unit L1, and the second inductor unit L2. It can be understood that the fourth resonance frequency herein may be a frequency obtained, for example, acquired, captured, received, detected, or stored, by the controller 100, may be an overload resonance frequency of the filter circuit 102, or may be a frequency calculated by the controller 100 based on a current output current value of the inverter apparatus. This may be specifically set based on an application scenario. It can be understood that the fourth resonance frequency herein may be one frequency value, a plurality of frequency values, a frequency range including a plurality of frequency values, or a plurality of frequency ranges including a plurality of frequency values.

In this application, based on the switching frequencies of the plurality of power switching transistors in the inverter circuit 101, the filter circuit 102 may produce resonance at different resonance frequencies through different resonant branches, to ensure that the resonance frequency of the filter circuit 102 meets a requirement for system stability. A response is fast, and a control method is simple, so that system stability and security are improved, and applicability is high.

Figure 3:
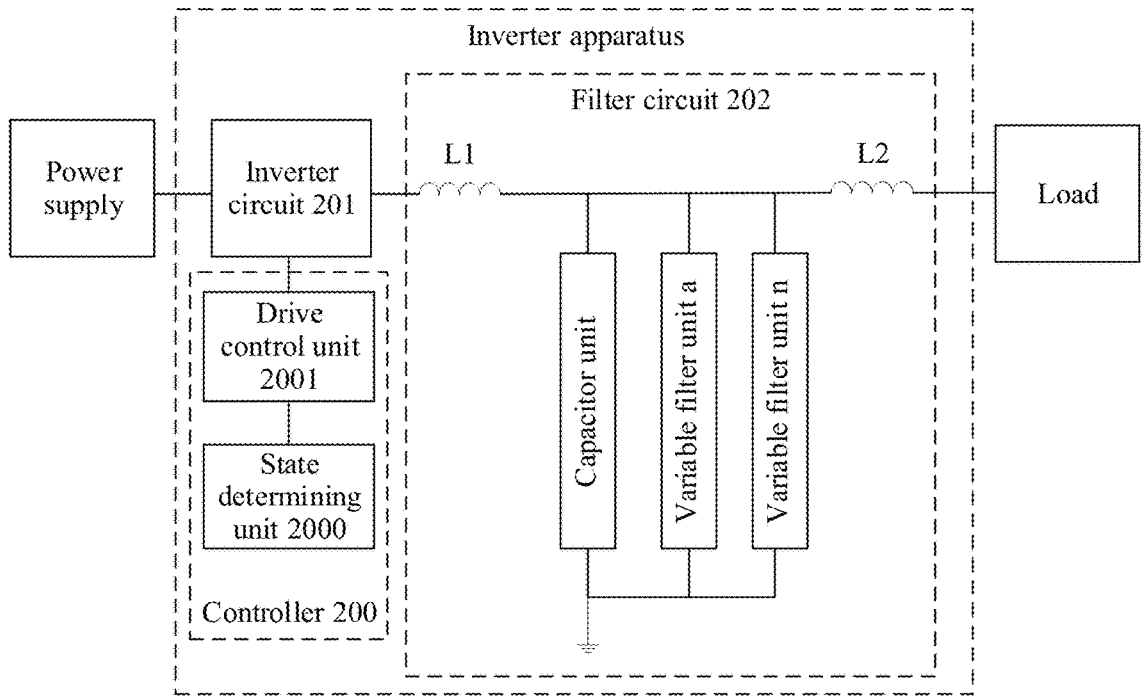
FIG. 3 is a schematic diagram of another structure of an inverter apparatus according to an embodiment of this application.

In some feasible implementations, the controller may include a state determining unit and a drive control unit. For details, refer to FIG. 3. FIG. 3 is a schematic diagram of another structure of an inverter apparatus according to an embodiment of this application. As shown in FIG. 3, the inverter apparatus includes an inverter circuit 201, a controller 200, and a filter circuit 202. The controller 200 includes a state determining unit 2000 and a drive control unit 2001. The state determining unit 2000 is connected to the inverter circuit 201 through the drive control unit 2001. The state determining unit 2000 herein may be configured to output a first state signal when an output current value of the inverter apparatus is less than an overload current value. The state determining unit 2000 herein may be configured to output a second state signal when the output current value of the inverter apparatus is greater than or equal to the overload current value. The drive control unit 2001 herein may control, based on the first state signal, switching frequencies of a plurality of power switching transistors in the inverter circuit 201 to be a first switching frequency, or control, based on the second state signal, the switching frequencies of the plurality of power switching transistors in the inverter circuit 201 to be a second switching frequency. It can be understood that, when the output current value of the inverter apparatus is less than the overload current value, it may indicate that a current load status meets an operation condition of the inverter apparatus (for example, a load is within a rated load range), and the controller 200 herein may output the first state signal to indicate that the inverter circuit 201 is currently in a rated operating state or a rated operating mode, and control the switching frequencies of the plurality of power switching transistors in the inverter circuit 201 to be the first switching frequency. When the switching frequency is the first switching frequency, a first resonant branch of a plurality of resonant branches in the filter circuit 202 has lowest equivalent impedance, and resonance may be produced through the first resonant branch. In this way, when the inverter circuit 201 is in the rated operating state or the rated operating mode, a resonance frequency of the filter circuit 202 is adjusted to a first resonance frequency through the first resonant branch. Alternatively, the filter circuit 202 may control, based on the indication of the first state signal, a switch (or by using another control method) to turn on the first resonant branch and turn off another resonant branch (for example, a second resonant branch), to produce resonance through the first resonant branch. In this way, when the inverter circuit 201 is in the rated operating state or the rated operating mode, the resonance frequency of the filter circuit 202 is adjusted to the first resonance frequency through the first resonant branch, so that the resonance frequency of the filter circuit 202 meets a grid-tied requirement. In addition, it can be understood that, when the output current value of the inverter apparatus is greater than or equal to the overload current value, it may indicate that a current load status does not meet an operation condition of the inverter apparatus (for example, the load increases and is in an overload state), and the controller 200 may output the second state signal to indicate that the inverter circuit 201 is currently in an overload operating state or an overload operating mode, and control the switching frequencies of the plurality of power switching transistors in the inverter circuit 201 to be the second switching frequency. When the switching frequency is the second switching frequency, the second resonant branch of the plurality of resonant branches in the filter circuit 202 has lowest equivalent impedance, and resonance may be produced through the second resonant branch. In this way, when the inverter circuit 201 is in the overload operating state or the overload operating mode, the resonance frequency of the filter circuit 202 is adjusted to the second resonance frequency through the second resonant branch. Alternatively, the filter circuit 202 may control, based on the indication of the second state signal, a switch (or by using another control method) to turn on the second resonant branch and turn off another resonant branch (for example, the first resonant branch), to produce resonance through the second resonant branch. In this way, when the inverter circuit 201 is in the overload operating state or the overload operating mode, the resonance frequency of the filter circuit 202 is adjusted to the second resonance frequency through the second resonant branch, so that the resonance frequency of the filter circuit 202 meets a grid-tied requirement again. Herein, the controller 200 may output, based on the output circuit value of the inverter apparatus, different state signals to indicate a current operating status of the inverter circuit 201, so as to control the inverter circuit 201 to use different switching frequencies, and adjust the resonance frequency of the filter circuit 202 through different resonant branches. This improves power supply efficiency of the system and reduces a loss while ensuring system stability. A response is fast, and a control method is simple.

In some feasible implementations, the state determining unit 2000 herein may be further configured to output a first reset signal when the switching frequencies of the plurality of power switching transistors in the inverter circuit 201 are the second switching frequency and the output current value of the inverter apparatus is less than a reset current value. The drive control unit 2001 herein may further control, based on the first reset signal, the switching frequencies of the plurality of power switching transistors in the inverter circuit 201 to be the first switching frequency. It can be understood that, when the output current value of the inverter apparatus is less than the reset current value, it may indicate that a current load status meets an operation condition of the inverter apparatus again (for example, the load is reduced to be within rated load range), and the controller 200 herein may output the first reset signal to indicate that the inverter circuit 201 currently switches from the overload operating state or the overload operating mode back to the rated operating state or the rated operating mode, and control the switching frequencies of the plurality of power switching transistors in the inverter circuit 201 to be increased to the first switching frequency. When the switching frequency is re-increased to the first switching frequency, the first resonant branch of the plurality of resonant branches in the filter circuit 202 has lowest equivalent impedance, and resonance may be re-produced through the first resonant branch. In this way, when the inverter circuit 201 is in the rated operating state or the rated operating mode again, the resonance frequency of the filter circuit 202 is re-adjusted to the first resonance frequency through the first resonant branch. Alternatively, the filter circuit 202 may control, based on the indication of the first reset signal, a switch (or by using another control method) to turn on the first resonant branch and turn off another resonant branch (for example, the second resonant branch) again, to produce resonance through the first resonant branch. In this way, when the inverter circuit 201 is in the rated operating state or the rated operating mode again, the resonance frequency of the filter circuit 202 is adjusted to the first resonance frequency through the first resonant branch, so that the resonance frequency of the filter circuit 202 meets a grid-tied requirement again, and power supply efficiency is improved. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit 201 is re-increased may be a frequency greater than a current switching frequency (for example, the second switching frequency) of the inverter circuit 201, may be a frequency obtained, for example, acquired, captured, received, detected, or stored, by the controller 200, may be switching frequencies of the plurality of power switching transistors in the inverter circuit 201 in a rated operating state, or may be a frequency calculated by the controller 200 based on a current output current value of the inverter apparatus. This may be specifically set based on an application scenario. It can be understood that the first switching frequency to which the inverter circuit 201 is re-increased herein may be one frequency value, a plurality of frequency values, a frequency range including a plurality of frequency values, or a plurality of frequency ranges including a plurality of frequency values. Herein, when the load of the power supply system meets a current operating status of the inverter apparatus again, the controller 200 may re-increase the switching frequencies of the plurality of power switching transistors in the inverter circuit 201 to the first switching frequency. This improves power supply efficiency of the system and reduces a loss while ensuring system stability. A response is fast, and a control method is simple.

Figure 4:
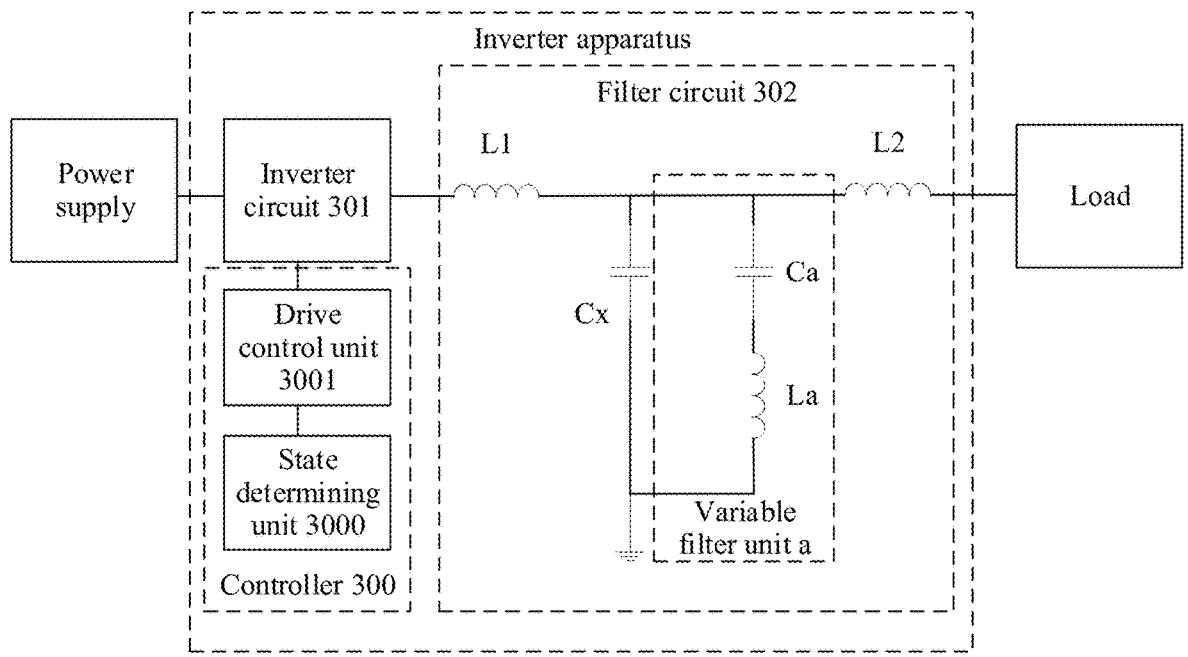
FIG. 4 is a schematic diagram of another structure of an inverter apparatus according to an embodiment of this application.

In some feasible implementations, the variable filter unit may include a variable capacitor unit and a variable inductor unit. FIG. 4 is a schematic diagram of another structure of an inverter apparatus according to an embodiment of this application. As shown in FIG. 4, the inverter apparatus includes an inverter circuit 301, a controller 300, and a filter circuit 302. The controller 300 includes a state determining unit 3000 and a drive control unit 3001. The filter circuit 302 includes a first inductor unit L1, a second inductor unit L2, and a plurality of resonant units. The plurality of resonant units include a capacitor unit Cx and a variable filter unit a. The variable filter unit a includes a variable capacitor unit Ca and a variable inductor unit La. Herein, the first inductor unit L1, the second inductor unit L2, the capacitor unit Cx, the variable capacitor unit Ca, and the variable inductor unit La may be a capacitor or inductor unit including one inductor or capacitor, or may be a capacitor or inductor unit integrating a plurality of capacitors or a plurality of inductors. Herein, the variable capacitor unit Ca and the variable inductor unit La are connected in series, and the capacitor unit Cx, the variable capacitor unit Ca, and the variable inductor unit La meet the following formulas:

$$Z_{11} < Z_{21} \tag{1}$$

$$Z_{12} > Z_{22} \tag{2}$$

Herein, $Z_{11}$ is equivalent impedance of the capacitor unit in a case in which a switching frequency is a first switching frequency, $Z_{21}$ is equivalent impedance of the variable filter unit in a case in which the switching frequency is the first switching frequency, $Z_{12}$ is equivalent impedance of the capacitor unit in a case in which the switching frequency is a second switching frequency, and $Z_{22}$ is equivalent impedance of the variable filter unit in a case in which the switching frequency is the second switching frequency.

In some feasible implementations, the variable filter unit a including the variable capacitor unit Ca and the variable inductor unit La that are connected in series produces resonance at the second switching frequency. When switching frequencies of a plurality of power switching transistors in the inverter circuit 301 are the second switching frequency, the variable filter unit a has lowest equivalent impedance. The capacitor unit Cx, the variable capacitor unit Ca, and the variable inductor unit La meet the following formulas:

$$1/j2\pi f1 C0 < j2\pi f1 L + 1/j2\pi f1 C \qquad (3)$$

$$1/j2\pi f2 C0 > j2\pi f2 L + 1/j2\pi f2 C \qquad (4)$$

f1 is the first switching frequency, f2 is the second switching frequency, C0 is an equivalent capacitance value of the capacitor unit, L is an equivalent inductance value of the variable inductor unit, C is an equivalent capacitance value of the variable capacitor unit, $1/j2\pi f1 C0$ is equivalent impedance of the capacitor unit in a case in which the switching frequency is the first switching frequency, $j2\pi f1 L+1/j2\pi f1 C$ is equivalent impedance of the variable filter unit in a case in which the switching frequency is the first switching frequency, $1/j2\pi f2 C0$ is equivalent impedance of the capacitor unit in a case in which the switching frequency is the second switching frequency, and $j2\pi f2 L+1/j2\pi f2 C$ is equivalent impedance of the variable filter unit in a case in which the switching frequency is the second switching frequency.

It can be understood that, when the switching frequency is the first switching frequency, the equivalent impedance Z11 of the capacitor unit is less than the equivalent impedance Z21 of the variable filter unit, an output current of the inverter circuit 301 mainly flows through a first resonant branch including the capacitor unit, the first inductor unit L1, and the second inductor unit L2, and the filter circuit performs filtering (for example, through an LCL filter circuit) through the first resonant branch, and produces resonance at a first resonance frequency. When the switching frequency is the second switching frequency, the equivalent impedance Z12 of the capacitor unit is greater than the equivalent impedance Z22 of the variable filter unit, an output current of the inverter circuit 301 mainly flows through a second resonant branch including the variable filter unit, the first inductor unit L1, and the second inductor unit L2, and the filter circuit performs filtering (for example, through an LLCL filter circuit) through the second resonant branch, and produces resonance at a second resonance frequency.

In this application, based on the switching frequencies of the plurality of power switching transistors in the inverter circuit 301, the filter circuit 302 may produce resonance at different resonance frequencies through different resonant branches, to ensure that a resonance frequency of the filter circuit 302 meets a requirement for system stability. A response is fast, and a control method is simple, so that system stability and security are improved, and applicability is high.

Figure 5:
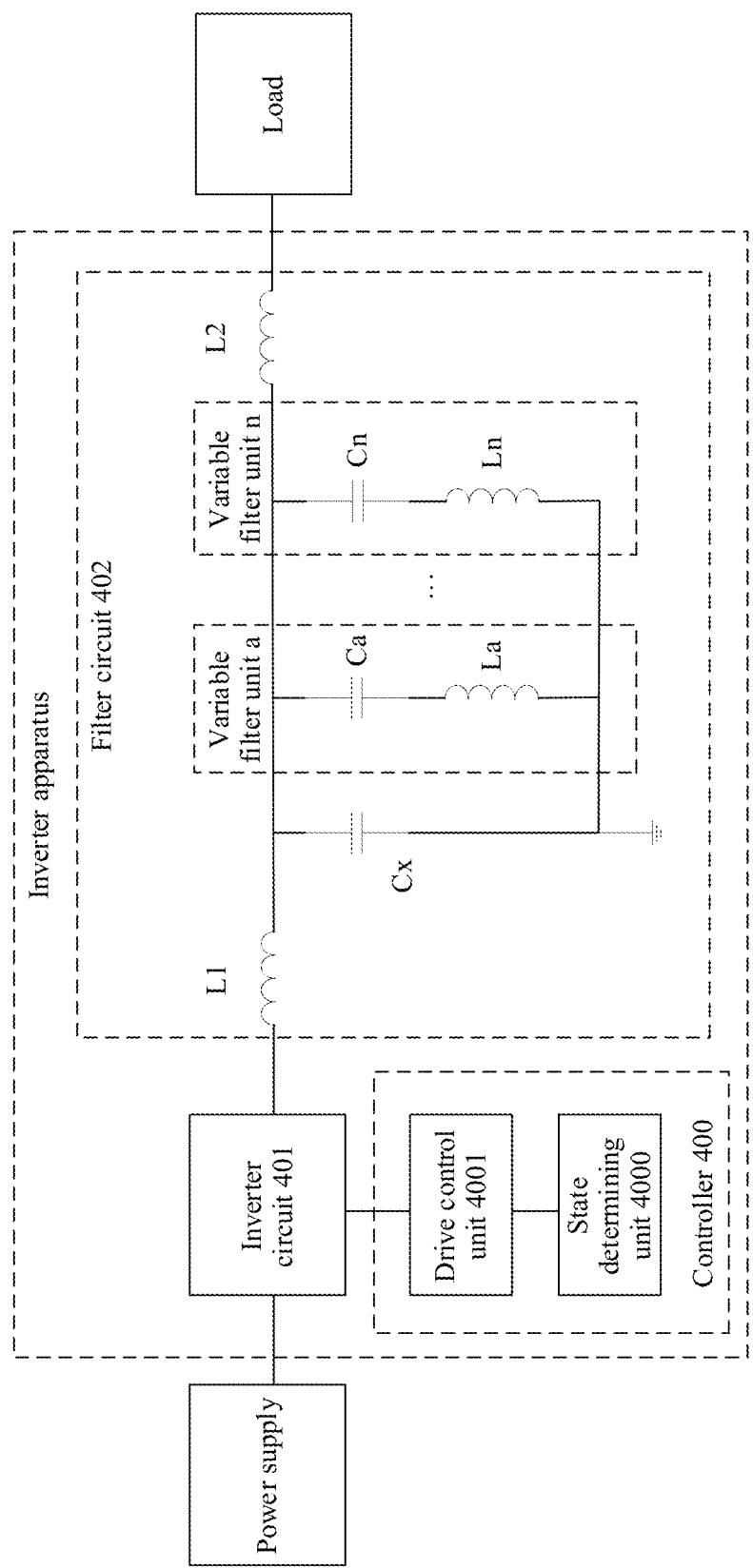
FIG. 5 is a schematic diagram of another structure of an inverter apparatus according to an embodiment of this application.

In some feasible implementations, the plurality of resonant units in the filter circuit may include a capacitor unit and a plurality of variable filter units, and each variable filter unit may include a variable capacitor unit and a variable inductor unit. FIG. 5 is a schematic diagram of another structure of an inverter apparatus according to an embodiment of this application. As shown in FIG. 5, the inverter apparatus includes an inverter circuit 401, a controller 400, and a filter circuit 402. The controller 400 includes a state determining unit 4000 and a drive control unit 4001. The filter circuit 402 includes a first inductor unit L1, a second inductor unit L2, a capacitor unit Cx, and a plurality of variable filter units. For example, a variable filter unit a includes a variable capacitor unit Ca and a variable inductor unit La, and a variable filter unit n includes a variable capacitor unit Cn and a variable inductor unit Ln. Herein, the first inductor unit L1, the second inductor unit L2, the capacitor unit Cx, the variable capacitor unit Ca, the variable inductor unit La, the variable capacitor unit Cn, and the variable inductor unit Ln may be a capacitor or inductor unit including one inductor or capacitor, or may be a capacitor or inductor unit integrating a plurality of capacitors or a plurality of inductors.

In some feasible implementations, when a load further increases, the controller 400 may further reduce switching frequencies of a plurality of power switching transistors in the inverter circuit 401. When the switching frequencies of the plurality of power switching transistors in the inverter circuit 401 are a fourth switching frequency (herein, the fourth switching frequency is less than a second switching frequency), a plurality of resonant units in the filter circuit 402 may produce resonance at a fourth resonance frequency (herein, the fourth resonance frequency is less than a second resonance frequency) by using (by controlling a switch, by controlling a selector, based on different impedance or capacitive reactance of units, or in another manner) another resonant branch (for example, a third resonant branch) that includes the variable filter unit (for example, the variable filter unit n), the first inductor unit L1, and the second inductor unit L2. It can be understood that the fourth resonance frequency herein may be a frequency obtained, for example, acquired, captured, received, detected, or stored, by the controller 400, may be an overload resonance frequency of the filter circuit 402, or may be a frequency calculated by the controller 400 based on a current output current value of the inverter apparatus. This may be specifically set based on an application scenario. It can be understood that the fourth resonance frequency herein may be one frequency value, a plurality of frequency values, a frequency range including a plurality of frequency values, or a plurality of frequency ranges including a plurality of frequency values.

In some feasible implementations, resonance frequencies of the variable capacitor unit Cn and the variable inductor unit Ln in the variable filter unit n may be the fourth switching frequency. To be specific, the variable capacitor unit Cn and the variable inductor unit Ln have lowest equivalent impedance when the switching frequency is the fourth switching frequency. To be specific, when the switching frequency is the fourth switching frequency, equivalent impedance of the capacitor unit and equivalent impedance of the variable filter unit a are greater than equivalent impedance of the variable filter unit n, an output current of the inverter circuit 401 mainly flows through the variable filter unit n, the variable filter unit n, the first inductor unit, and the second inductor unit constitute another resonant branch (for example, the third resonant branch), and resonance is produced at the fourth resonance frequency.

Figure 6:
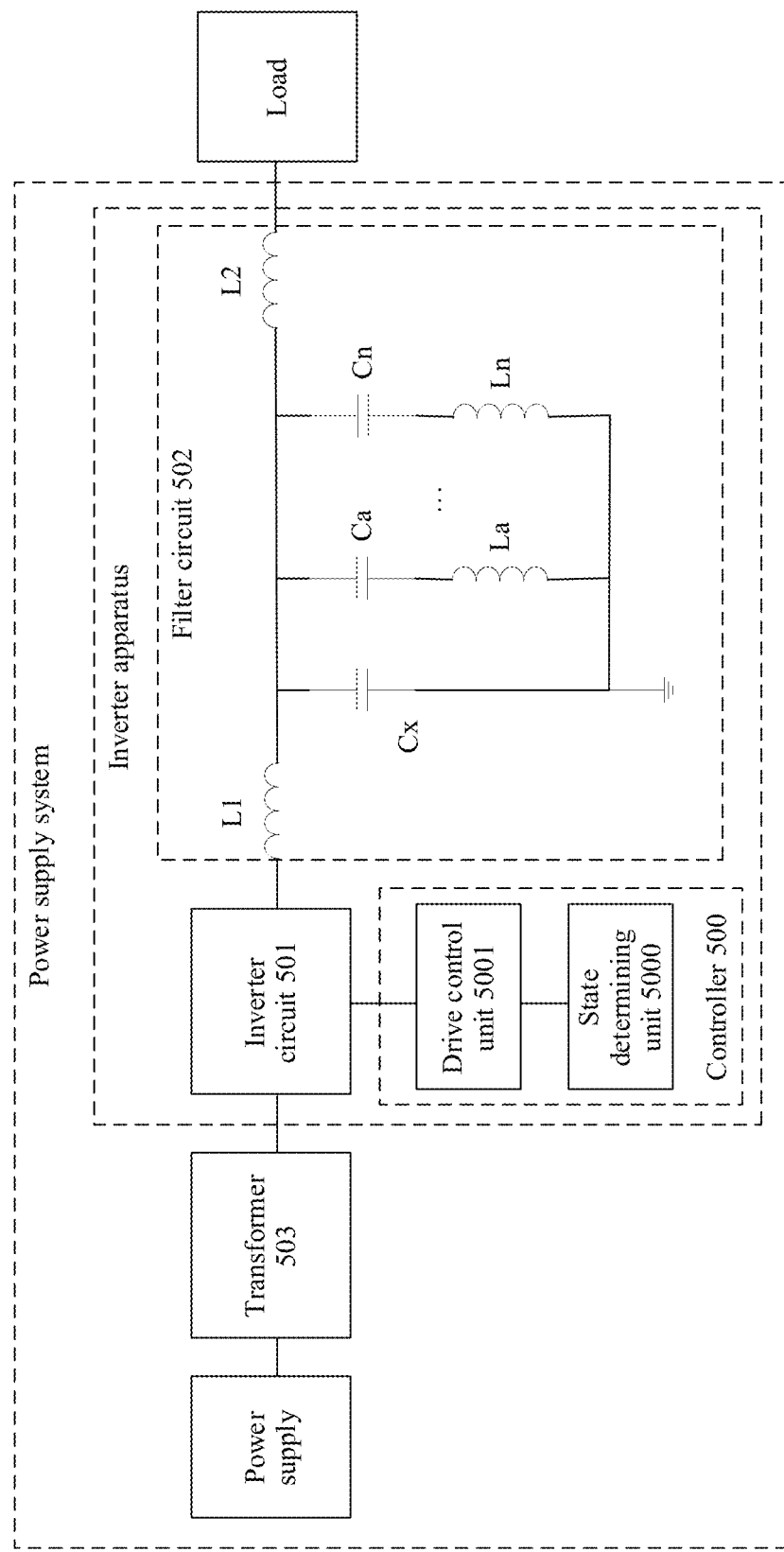
FIG. 6 is a schematic diagram of a structure of a power supply system according to an embodiment of this application.

FIG. 6 is a schematic diagram of a structure of a power supply system according to an embodiment of this application. As shown in FIG. 6, the power supply system may include a transformer 503, and a power supply may be connected to an inverter apparatus through the transformer 503. The transformer 503 herein may convert a voltage output by the power supply into a voltage matching the inverter apparatus, and output transformed electric energy to the inverter apparatus. Direct-current electric energy output by the inverter apparatus is converted into alternating-current electric energy, and the alternating-current electric energy is transmitted to a load. In this way, the system can supply power to a power grid or a load of an alternating-current electric device type on a power grid side, so that adaptability of the system is improved. A connection mode and an operating principle of the power supply, the inverter apparatus (including a controller 500 (including a state determining unit 5000 and a drive control unit 5001), an inverter circuit 501, and a filter circuit 502), and the load in FIG. 6 are the same as those of the power supply, the inverter apparatus (including the controller 400 (including the state determining unit 4000 and the drive control unit 4001), the inverter circuit 401, and the filter circuit 402), and the load in FIG. 5. Details are not described herein again.

In this application, when switching frequencies of a plurality of power switching transistors in the inverter circuit are reduced due to overload of the power supply system, resonance may be performed through a resonant branch with lowest equivalent impedance among a plurality of resonant branches, to adjust a resonance frequency of the filter circuit in a timely manner, so as to ensure that the resonance frequency of the filter circuit meets a requirement for system stability. A response is fast, and a control method is simple, so that system stability and security are improved, and applicability is high.

In some feasible implementations, the power supply system may further include a direct current bus, and the transformer 503 may be connected to the power grid through the direct current bus and the inverter apparatus. Herein, the direct current bus may include one bus capacitor or a plurality of bus capacitors connected in series, and the bus capacitor may be configured to store energy. The direct current bus may include a bus capacitor, and the inverter apparatus may convert electric energy that is output by the power supply and that is stored at two ends of the bus capacitor, and output a corresponding current and voltage to maintain operation of the power grid.

Figure 7:
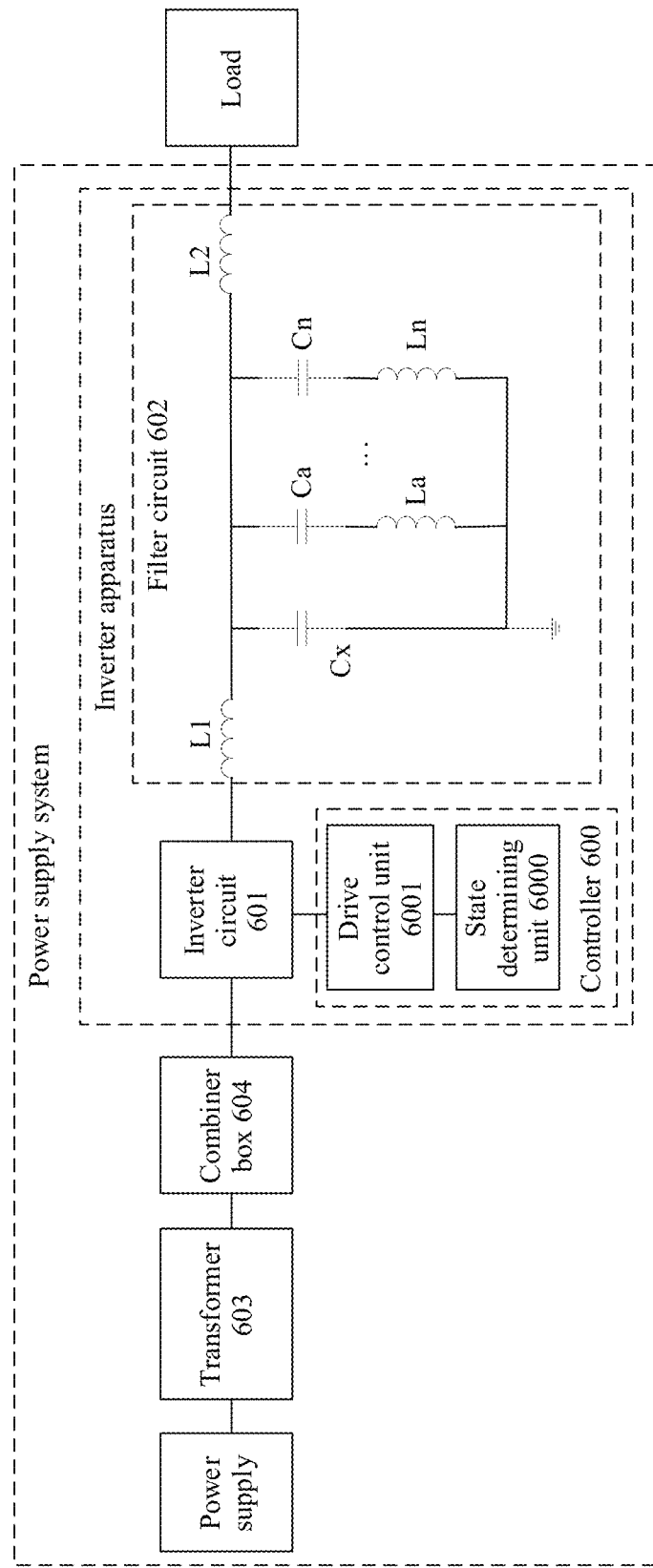
FIG. 7 is a schematic diagram of another structure of a power supply system according to an embodiment of this application.

FIG. 7 is a schematic diagram of another structure of a power supply system according to an embodiment of this application. The power supply system shown in FIG. 7 may further include a combiner box 604, and a transformer in the power supply system may be connected to an inverter apparatus through the combiner box 604. It can be understood that the transformer in the power supply system may be connected to the combiner box 604 and then directly connected to the inverter apparatus through the combiner box 604, or may be connected to a direct current bus through the combiner box 604 and connected to the inverter apparatus through the direct current bus. This may be specifically set based on an actual application scenario, and is not limited herein. A connection mode and an operating principle of a power supply, the inverter apparatus (including a controller 600 (including a state determining unit 6000 and a drive control unit 6001), an inverter circuit 601, and a filter circuit 602), the transformer 603, and a load in FIG. 7 are the same as those of the power supply, the inverter apparatus (including the controller 500 (including the state determining unit 5000 and the drive control unit 5001), the inverter circuit 501, and the filter circuit 502), the transformer 503, and the load in FIG. 6. Details are not described herein again.

Figure 8:
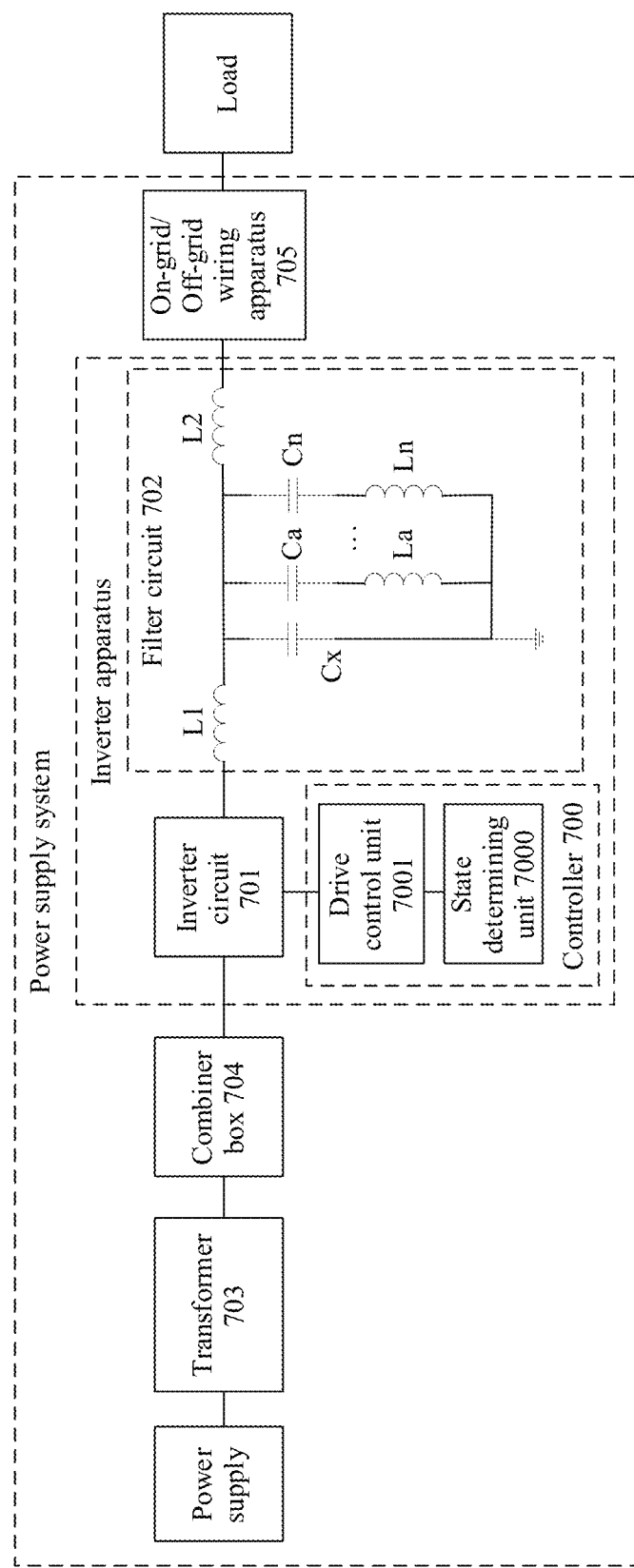
FIG. 8 is a schematic diagram of another structure of a power supply system according to an embodiment of this application.

FIG. 8 is a schematic diagram of another structure of a power supply system according to an embodiment of this application. As shown in FIG. 8, a load of the power supply system may further include an on-grid/off-grid wiring apparatus 705, and an inverter apparatus may supply power to an electric device or a power transmission device such as a transmission cable, a power transfer station, a battery, a communication base station, or a home device in a power grid through the on-grid/off-grid wiring apparatus 705. A connection mode and an operating principle of a power supply, the inverter apparatus (including a controller 700 (including a state determining unit 7000 and a drive control unit 7001), an inverter circuit 701, and a filter circuit 702), a transformer 703, a combiner box 704, and the load in FIG. 8 are the same as those of the power supply, the inverter apparatus (including the controller 600 (including the state determining unit 6000 and the drive control unit 6001), the inverter circuit 601, and the filter circuit 602), the transformer 603, the combiner box 604, and the load in FIG. 7. Details are not described herein again.

In this application, functional modules in the power supply system are combined in various and flexible manners to adapt to different power supply environments, so that diversity of application scenarios of the power supply system is improved, and adaptability of the power supply system is enhanced. In addition, in any one of the power supply systems shown in FIG. 1 to FIG. 8, or in another inverter apparatus connected to a power grid, or in a controller of another inverter apparatus connected to a power grid, the power supply system (or the inverter apparatus, or the controller of the inverter apparatus) may produce resonance through different resonant branches when switching frequencies of a plurality of power switching transistors in an inverter circuit are reduced due to overload of the power supply system, to adjust a resonance frequency of a filter circuit in a timely manner, so as to ensure that the resonance frequency of the filter circuit meets a requirement for system stability. For ease of description, the following describes a grid-tied control method in embodiments of this application by using the structure of the power supply system shown in FIG. 2 as an example.

Figure 9:
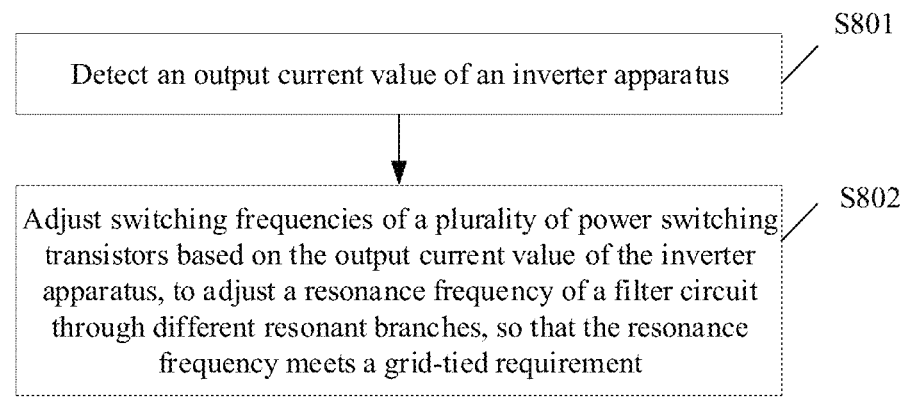
FIG. 9 is a schematic flowchart of a grid-tied control method according to an embodiment of this application.

FIG. 9 is a schematic flowchart of a grid-tied control method according to this application. The grid-tied control method provided in this application is applicable to an inverter apparatus, and is also applicable to any one of the grid-tied inverter apparatuses or the power supply systems shown in FIG. 1 to FIG. 8. As shown in FIG. 9, the grid-tied control method provided in this application includes the following steps.

S801: Detect an output current value of the inverter apparatus.

S802: Adjust switching frequencies of a plurality of power switching transistors based on the output current value of the inverter apparatus, to adjust a resonance frequency of a filter circuit through different resonant branches, so that the resonance frequency meets a grid-tied requirement.

In this application, a controller may obtain (for example, acquire, capture, receive, detect, or store) the output current value of the inverter apparatus. The output current value of the inverter apparatus herein may be an output current value of an inverter circuit, an output current value at a junction (for example, a grid-tied point in a case in which a load is a power grid) between the inverter apparatus and the load, or an output current value of a sampling point. This may be specifically set based on an application scenario. Herein, the controller may adjust the switching frequencies of the plurality of power switching transistors based on the output current value of the inverter apparatus. It can be understood that, in different application scenarios (for example, the inverter apparatus is equivalent to a voltage source in a grid-forming scenario), the controller may control, based on the output current value of the inverter apparatus, the switching frequencies of the plurality of power switching transistors to be different switching frequencies, to adjust output power of the inverter apparatus to adapt to a change of a load end and ensure normal power supply to the load. For example, in a scenario in which the power supply system is overloaded (to be specific, the load increases), the controller may reduce the switching frequencies of the plurality of power switching transistors. During operation of the inverter apparatus, because a switching frequency of an element (for example, a switching transistor) in the inverter circuit is high and a current (or a voltage) output by the inverter circuit includes harmonics, the filter circuit needs to be disposed between the inverter circuit and the load, to filter out, through the filter circuit, the harmonics included in the current (or the voltage) output by the inverter circuit. In a process in which the power supply system is connected to a power grid for grid connection, to maintain system stability, it is usually required that the resonance frequency of the filter circuit be less than a specific value (for example, ¼ of the switching frequency). Herein, the filter circuit includes a plurality of resonant branches that include an inductor unit and a plurality of resonant units connected in parallel, and the apparatus may further adjust the resonance frequency of the filter circuit through different resonant branches. For example, in the scenario in which the power supply system is overloaded (to be specific, the load increases), the controller may reduce the switching frequencies of the plurality of power switching transistors, to adjust the resonance frequency of the filter circuit through the plurality of resonant units based on reduced switching frequencies of the plurality of power switching transistors, so as to maintain stability of the power supply system.

In some feasible implementations, the adjusting switching frequencies of a plurality of power switching transistors based on the output current value of the inverter apparatus, to adjust a resonance frequency of a filter circuit through different resonant branches in step S802 may include: when the switching frequencies of the plurality of power switching transistors are different, performing resonance through a resonant branch with lowest equivalent impedance among the plurality of resonant branches, to adjust the resonance frequency of the filter circuit. Herein, the controller synchronously changes equivalent impedance in the plurality of resonant branches when adjusting the switching frequencies of the plurality of power switching transistors. Herein, different resonant branches (for example, a first resonant branch including a capacitor unit and the inductor unit, and a second resonant branch including a variable filter unit and the inductor unit) have different equivalent impedance at different switching frequencies. When the controller adjusts the switching frequencies of the plurality of power switching transistors, a current mainly flows through a resonant branch with lowest equivalent impedance at a current switching frequency, so that the resonant branch currently with the lowest equivalent impedance and another element in the filter circuit produce resonance at a resonance frequency corresponding to the current switching frequency. Further, the filter circuit 12 may adjust the resonance frequency through different resonant branches based on different switching frequencies of the inverter circuit 11.

In this application, when the switching frequencies of the plurality of power switching transistors in the inverter circuit are reduced due to overload of the power supply system, resonance may be performed through a resonant branch with lowest equivalent impedance among the plurality of resonant branches, to adjust the resonance frequency of the filter circuit in a timely manner. This ensures that the resonance frequency of the filter circuit meets a requirement for system stability, while enhancing a loading capability of the apparatus. A response is fast, and a control method is simple, so that system stability and security are improved, and applicability is high.

Figure 10:
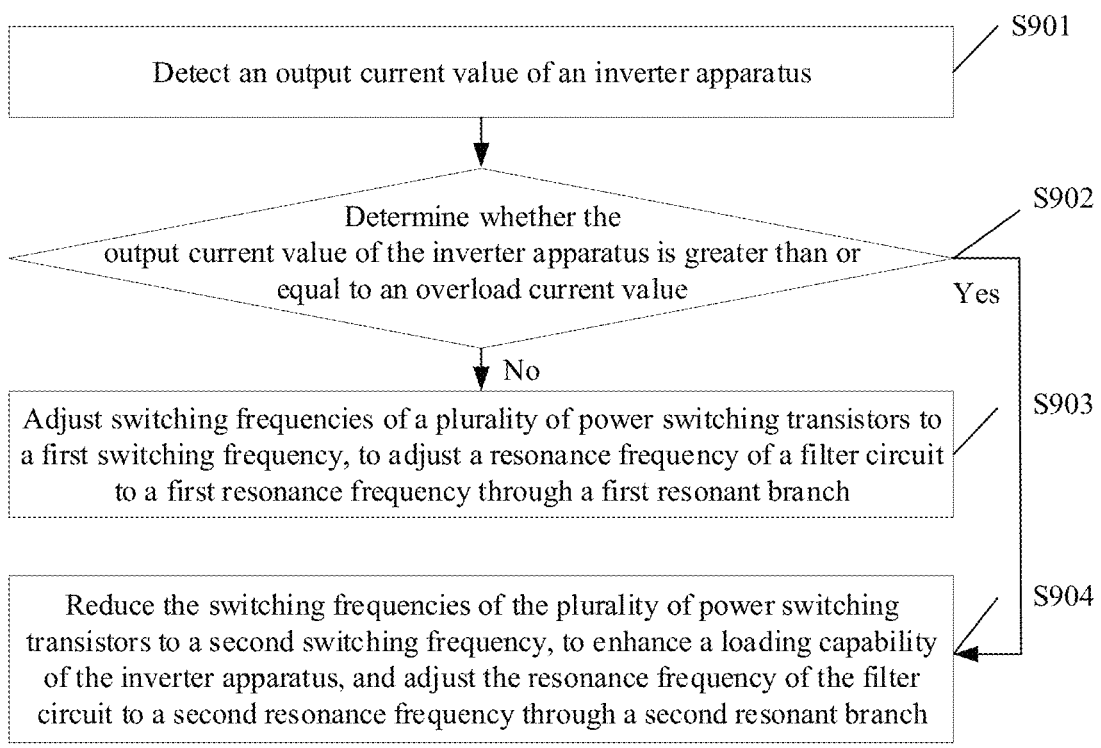
FIG. 10 is another schematic flowchart of a grid-tied control method according to an embodiment of this application.

In some feasible implementations, the plurality of resonant units include a capacitor unit and at least one variable filter unit, the inductor unit includes a first inductor unit and a second inductor unit, the first inductor unit and the second inductor unit are connected in series between the inverter circuit and the load, the capacitor unit and the variable filter unit are connected in parallel between the first inductor unit and the second inductor unit, the capacitor unit and the inductor unit constitute a first resonant branch, and the variable filter unit and the inductor unit constitute a second resonant branch. Further, FIG. 10 is another schematic flowchart of a grid-tied control method according to this application. As shown in FIG. 10, the control method may include the following steps.

S901: Detect an output current value of an inverter apparatus.

S902: Determine whether the output current value of the inverter apparatus is greater than or equal to an overload current value. If a determining result of step S902 is no, step S903 is performed. If a determining result of step S902 is yes, step S904 is performed.

S903: Adjust switching frequencies of a plurality of power switching transistors to a first switching frequency, to adjust a resonance frequency of a filter circuit to a first resonance frequency through a first resonant branch.

In some feasible implementations, after a controller obtains (for example, acquires, captures, receives, detects, or stores) the output current value of the inverter apparatus, the controller may control the switching frequencies of the plurality of power switching transistors based on the output current value of the inverter apparatus. When the output current value of the inverter apparatus is less than the overload current value, it may indicate that a current load status meets an operation condition of the inverter apparatus (for example, a load is within a rated load range), and the controller may adjust the switching frequencies of the plurality of power switching transistors to the first switching frequency. Herein, the first switching frequency may be a current switching frequency of an inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency herein may be one frequency value, a plurality of frequency values, a frequency range including a plurality of frequency values, or a plurality of frequency ranges including a plurality of frequency values. Herein, among a plurality of resonant branches, the first resonant branch including a capacitor unit and an inductor unit (for example, a first inductor unit and a second inductor unit) has lowest equivalent impedance when the switching frequencies of the plurality of power switching transistors are the first switching frequency, and a current mainly flows through the first resonant branch including the capacitor unit and the inductor unit (for example, the first inductor unit and the second inductor unit), so that the first resonant branch produces resonance at a resonance frequency (namely, the first resonance frequency) corresponding to the first switching frequency. That is, when the output current value of the inverter apparatus is less than the overload current value, the resonance frequency of the filter circuit may be adjusted to the first resonance frequency through the first resonant branch based on the switching frequencies (namely, the first switching frequency) of the plurality of power switching transistors. Herein, the first resonance frequency is less than a first stabilized frequency, and the first stabilized frequency is a grid-tied stabilized frequency corresponding to the first switching frequency (for example, the first stabilized frequency is ¼ of the first switching frequency). In a process in which a power supply system is connected to a power grid for grid connection, to meet a requirement for system stability, the first resonance frequency needs to be less than a specific grid-tied stabilized frequency (for example, ¼ of the first switching frequency). It can be understood that a value of the first resonance frequency herein may be determined based on a current resonance frequency of the filter circuit, may be a frequency obtained, for example, acquired, captured, received, detected, or stored, by the controller, may be a rated resonance frequency of the filter circuit, or may be a frequency calculated by the controller based on a current output current value of the inverter apparatus. This may be specifically set based on an application scenario. It can be understood that the first resonance frequency herein may be one frequency value, a plurality of frequency values, a frequency range including a plurality of frequency values, or a plurality of frequency ranges including a plurality of frequency values.

In this application, when a load of the power supply system meets a current operating status of the inverter apparatus, the switching frequencies of the plurality of power switching transistors may be adjusted to the first switching frequency, to adjust the resonance frequency of the filter circuit to the first resonance frequency through the first resonant branch, so as to ensure that the resonance frequency of the filter circuit meets a requirement for system stability. A control method is simple and flexible, and has high applicability.

S904: Reduce the switching frequencies of the plurality of power switching transistors to a second switching frequency, to enhance a loading capability of the inverter apparatus, and adjust the resonance frequency of the filter circuit to a second resonance frequency through a second resonant branch.

In some feasible implementations, after the controller obtains (for example, acquires, captures, receives, detects, or stores) the output current value of the inverter apparatus, the controller may control the switching frequencies of the plurality of power switching transistors based on the output current value of the inverter apparatus. When the output current value of the inverter apparatus is greater than or equal to the overload current value, it may indicate that a current load status does not meet an operation condition of the inverter apparatus (for example, the load increases and is in an overload state), and the controller may reduce the switching frequencies of the plurality of power switching transistors to the second switching frequency, to enhance a loading capability of the inverter apparatus, and adjust the resonance frequency of the filter circuit to the second resonance frequency through the second resonant branch. Herein, the second switching frequency is less than the first switching frequency, and equivalent impedance of the second resonant branch is less than equivalent impedance of the first resonant branch when the switching frequency is the second switching frequency. Herein, the second switching frequency may be a frequency less than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in an overload operating state, or may be a frequency calculated by the controller based on a current output current value of the inverter apparatus. This may be specifically set based on an application scenario. It can be understood that the second switching frequency herein may be one frequency value, a plurality of frequency values, a frequency range including a plurality of frequency values, or a plurality of frequency ranges including a plurality of frequency values. Herein, among the plurality of resonant branches, the second resonant branch including a variable filter unit and the inductor unit (for example, the first inductor unit and the second inductor unit) has lowest equivalent impedance when the switching frequencies of the plurality of power switching transistors are the second switching frequency, and a current mainly flows through the second resonant branch including the variable filter unit and the inductor unit (for example, the first inductor unit and the second inductor unit), so that the second resonant branch produces resonance at a resonance frequency (namely, the second resonance frequency) corresponding to the second switching frequency. That is, when the output current value of the inverter apparatus is greater than or equal to the overload current value, the resonance frequency of the filter circuit may be reduced to the second resonance frequency through the second resonant branch based on the switching frequencies (namely, the second switching frequency) of the plurality of power switching transistors. Herein, the second resonance frequency is less than a second stabilized frequency and less than the first resonance frequency, and the second stabilized frequency is a grid-tied stabilized frequency corresponding to the second switching frequency (for example, the second stabilized frequency is ¼ of the second switching frequency). In a process in which the power supply system is connected to a power grid for grid connection, to meet a requirement for system stability, the second resonance frequency needs to be less than a specific grid-tied stabilized frequency (for example, ¼ of the second switching frequency). It can be understood that a value of the second resonance frequency herein may be determined based on a current resonance frequency of the filter circuit, may be a frequency obtained, for example, acquired, captured, received, detected, or stored, by the controller, may be an overload resonance frequency of the filter circuit, or may be a frequency calculated by the controller based on a current output current value of the inverter apparatus. This may be specifically set based on an application scenario. It can be understood that the second resonance frequency herein may be one frequency value, a plurality of frequency values, a frequency range including a plurality of frequency values, or a plurality of frequency ranges including a plurality of frequency values.

In this application, when the load of the power supply system increases and the inverter apparatus is in an overload operating state, the switching frequencies of the plurality of power switching transistors may be reduced to the second switching frequency, to adjust the resonance frequency of the filter circuit to the second resonance frequency through the second resonant branch, so as to ensure that the resonance frequency of the filter circuit meets a requirement for system stability. A control method is simple and flexible, and has high applicability.

In some feasible implementations, after the adjusting the resonance frequency of the filter circuit to a second resonance frequency through a second resonant branch in step S904, the method further includes: when the output current value of the inverter apparatus is less than a reset current value, increasing the switching frequencies of the plurality of power switching transistors to the first switching frequency, to adjust the resonance frequency of the filter circuit to the first resonance frequency through the first resonant branch. Herein, the reset current value is less than or equal to the overload current value.

It can be understood that, after the controller controls the switching frequencies of the plurality of power switching transistors to be the second switching frequency, the controller may further obtain (for example, acquire, capture, receive, detect, or store) the output current value of the inverter apparatus, and the controller may further control the switching frequencies of the plurality of power switching transistors based on the output current value of the inverter apparatus. When the switching frequencies of the plurality of power switching transistors are the second switching frequency and the output current value of the inverter apparatus is less than the reset current value, it may indicate that a current load status meets an operation condition of the inverter apparatus again (for example, the load is reduced to be within the rated load range), and the controller may increase the switching frequencies of the plurality of power switching transistors to the first switching frequency. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit is re-increased may be a frequency greater than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency to which the inverter circuit is re-increased herein may be one frequency value, a plurality of frequency values, a frequency range including a plurality of frequency values, or a plurality of frequency ranges including a plurality of frequency values. Correspondingly, when the output current value of the inverter apparatus is less than the reset current value, the resonance frequency of the filter circuit may be re-increased to the first resonance frequency through the first resonant branch based on the switching frequencies (namely, the first switching frequency) of the plurality of power switching transistors. Herein, the first resonance frequency to which the filter circuit is re-increased may be equal to the first resonance frequency obtained before the frequency reduction, or may be a third resonance frequency within a first resonance frequency range, and is not necessarily exactly equal to the first resonance frequency obtained before the frequency reduction. It can be understood that the first resonance frequency to which the filter circuit is re-increased herein may be a frequency obtained, for example, acquired, captured, received, detected, or stored, by the controller, may b e an overload resonance frequency of the filter circuit, or may be a frequency calculated by the controller based on a current output current value of the inverter apparatus. This may be specifically set based on an application scenario. It can be understood that the first resonance frequency to which the filter circuit is re-increased herein may be one frequency value, a plurality of frequency values, a frequency range including a plurality of frequency values, or a plurality of frequency ranges including a plurality of frequency values.

In this application, when the load of the power supply system meets a current operating status of the inverter apparatus again, the switching frequencies of the plurality of power switching transistors may be re-increased to the first switching frequency, to adjust the resonance frequency of the filter circuit to the first resonance frequency through the first resonant branch, so as to ensure that the resonance frequency of the filter circuit meets a requirement for system stability. A control method is simple and flexible, and has high applicability, so that power supply efficiency of the system is improved.

In some feasible implementations, after the detecting an output current value of the inverter apparatus in step S801 or S901, the method further includes: outputting a first state signal when the output current value of the inverter apparatus is less than the overload current value; outputting a second state signal when the output current value of the inverter apparatus is greater than or equal to the overload current value; and controlling, based on the first state signal, the switching frequencies of the plurality of power switching transistors to be the first switching frequency, or controlling, based on the second state signal, the switching frequencies of the plurality of power switching transistors to be the second switching frequency. It can be understood that, when the output current value of the inverter apparatus is less than the overload current value, it may indicate that a current load status meets an operation condition of the inverter apparatus (for example, the load is within the rated load range), and the controller herein may output the first state signal to indicate that the inverter circuit is currently in a rated operating state or a rated operating mode, and control the switching frequencies of the plurality of power switching transistors to be the first switching frequency. When the switching frequency is the first switching frequency, the first resonant branch of the plurality of resonant branches in the filter circuit has lowest equivalent impedance. Based on that the first resonant branch has the lowest equivalent impedance at the first switching frequency, the filter circuit may produce resonance through the first resonant branch. In this way, when the inverter circuit is in the rated operating state or the rated operating mode, the resonance frequency of the filter circuit is adjusted to the first resonance frequency through the first resonant branch. Alternatively, the filter circuit may control, based on the indication of the first state signal, a switch (or by using another control method) to turn on the first resonant branch and turn off another resonant branch (for example, the second resonant branch), to produce resonance through the first resonant branch. In this way, when the inverter circuit is in the rated operating state or the rated operating mode, the resonance frequency of the filter circuit is adjusted to the first resonance frequency through the first resonant branch, so that the resonance frequency of the filter circuit meets a grid-tied requirement. In addition, it can be understood that, when the output current value of the inverter apparatus is greater than or equal to the overload current value, it may indicate that a current load status does not meet an operation condition of the inverter apparatus (for example, the load increases and is in an overload state), and the controller may output the second state signal to indicate that the inverter circuit is currently in an overload operating state or an overload operating mode, and control the switching frequencies of the plurality of power switching transistors to be the second switching frequency. When the switching frequency is the second switching frequency, the second resonant branch of the plurality of resonant branches in the filter circuit has lowest equivalent impedance, and resonance may be produced through the second resonant branch. In this way, when the inverter circuit is in the overload operating state or the overload operating mode, the resonance frequency of the filter circuit is adjusted to the second resonance frequency through the second resonant branch. Alternatively, the filter circuit may control, based on the indication of the second state signal, a switch (or by using another control method) to turn on the second resonant branch and turn off another resonant branch (for example, the first resonant branch), to produce resonance through the second resonant branch. In this way, when the inverter circuit is in the overload operating state or the overload operating mode, the resonance frequency of the filter circuit is adjusted to the second resonance frequency through the second resonant branch, so that the resonance frequency of the filter circuit meets a grid-tied requirement again. Herein, the controller may output, based on the output circuit value of the inverter apparatus, different state signals to indicate a current operating status of the inverter circuit, so as to control the inverter circuit to use different switching frequencies, and adjust the resonance frequency of the filter circuit through different resonant branches. This improves power supply efficiency of the system and reduces a loss while ensuring system stability. A response is fast, and a control method is simple.

In some feasible implementations, after the controlling, based on the second state signal, the switching frequencies of the plurality of power switching transistors to be the second switching frequency, the method further includes: outputting a first reset signal when the output current value of the inverter apparatus is less than the reset current value; and controlling, based on the first reset signal, the switching frequencies of the plurality of power switching transistors to be the first switching frequency. It can be understood that, when the output current value of the inverter apparatus is less than the reset current value, it may indicate that a current load status meets an operation condition of the inverter apparatus again (for example, the load is reduced to be within rated load range), and the controller herein may output the first reset signal to indicate that the inverter circuit currently switches from the overload operating state or the overload operating mode back to the rated operating state or the rated operating mode, and control the switching frequencies of the plurality of power switching transistors to be increased to the first switching frequency. When the switching frequency is re-increased to the first switching frequency, the first resonant branch of the plurality of resonant branches in the filter circuit has lowest equivalent impedance, and resonance may be re-produced through the first resonant branch. In this way, when the inverter circuit is in the rated operating state or the rated operating mode again, the resonance frequency of the filter circuit is re-adjusted to the first resonance frequency through the first resonant branch. Alternatively, the filter circuit may control, based on the indication of the first reset signal, a switch (or by using another control method) to turn on the first resonant branch and turn off another resonant branch (for example, the second resonant branch) again, to produce resonance through the first resonant branch. In this way, when the inverter circuit is in the rated operating state or the rated operating mode again, the resonance frequency of the filter circuit is adjusted to the first resonance frequency through the first resonant branch, so that the resonance frequency of the filter circuit meets a grid-tied requirement again, and power supply efficiency is improved. Herein, the first switching frequency obtained through the re-increase may be equal to the first switching frequency obtained before the frequency reduction, or may be a third switching frequency within a first switching frequency range, and is not necessarily exactly equal to the first switching frequency obtained before the frequency reduction. Herein, the first switching frequency to which the inverter circuit is re-increased may be a frequency greater than a current switching frequency (for example, the second switching frequency) of the inverter circuit, may be a frequency obtained, for example, acquired, captured, received, detected, or stored, by the controller, may be switching frequencies of the plurality of power switching transistors in the inverter circuit in a rated operating state, or may be a frequency calculated by the controller based on a current output current value of the inverter apparatus. This may be specifically set based on an application scenario. It can be understood that the first switching frequency to which the inverter circuit is re-increased herein may be one frequency value, a plurality of frequency values, a frequency range including a plurality of frequency values, or a plurality of frequency ranges including a plurality of frequency values. Herein, when the load of the power supply system meets a current operating status of the inverter apparatus again, the controller may re-increase the switching frequencies of the plurality of power switching transistors to the first switching frequency. This improves power supply efficiency of the system and reduces a loss while ensuring system stability. A response is fast, and a control method is simple.

In this application, when the switching frequencies of the plurality of power switching transistors are reduced due to overload of the power supply system, resonance may be produced through different resonant branches, to adjust the resonance frequency of the filter circuit in a timely manner, so as to ensure that the resonance frequency of the filter circuit meets a requirement for system stability. A response is fast, and a control method is simple, so that system stability and security are improved, and applicability is high.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A grid-tied inverter apparatus, comprising:
    an inverter circuit comprising a plurality of power switching transistors connected in series or in parallel;
    a filter circuit comprising a plurality of resonant branches that comprise an inductor unit and a plurality of resonant units connected in parallel, wherein one end of the inverter circuit is connected to a direct current power supply, and another end of the inverter circuit is connected to a power grid or a load through the filter circuit; and
    a controller configured to adjust switching frequencies of the plurality of power switching transistors based on an output current value of the grid-tied inverter apparatus, to adjust a resonance frequency of the filter circuit through different resonant branches, wherein the resonance frequency meets a grid-tied requirement.

2. The grid-tied inverter apparatus according to claim 1, wherein the filter circuit is configured to:

when the switching frequencies of the plurality of power switching transistors are different, perform resonance through a resonant branch with a lowest equivalent impedance among the plurality of resonant branches, to adjust the resonance frequency of the filter circuit, wherein the controller is configured to synchronously change an equivalent impedance in the plurality of resonant branches when adjusting the switching frequencies of the plurality of power switching transistors.

3. The grid-tied inverter apparatus according to claim 2, wherein:
the plurality of resonant units comprise a capacitor unit and at least one variable filter unit, the inductor unit comprises a first inductor unit and a second inductor unit, the first inductor unit and the second inductor unit are connected in series between the inverter circuit and the load, the capacitor unit and the variable filter unit are connected in parallel between the first inductor unit and the second inductor unit, the capacitor unit and the inductor unit constitute a first resonant branch, and the variable filter unit and the inductor unit constitute a second resonant branch; and
the controller is further configured to: when the output current value of the grid-tied inverter apparatus is less than an overload current value, adjust the switching frequencies of the plurality of power switching transistors to a first switching frequency, to adjust the resonance frequency of the filter circuit to a first resonance frequency through the first resonant branch, wherein an equivalent impedance of the first resonant branch is less than an equivalent impedance of the second resonant branch when a switching frequency is the first switching frequency, the first resonance frequency is less than a first stabilized frequency, and the first stabilized frequency is a grid-tied stabilized frequency corresponding to the first switching frequency.

4. The grid-tied inverter apparatus according to claim 3, wherein the controller is further configured to:
when the output current value of the grid-tied inverter apparatus is greater than or equal to the overload current value, reduce the switching frequencies of the plurality of power switching transistors to a second switching frequency, and adjust the resonance frequency of the filter circuit to a second resonance frequency through the second resonant branch, wherein the second switching frequency is less than the first switching frequency, an equivalent impedance of the second resonant branch is less than an equivalent impedance of the first resonant branch when a switching frequency is the second switching frequency, the second resonance frequency is less than a second stabilized frequency and less than the first resonance frequency, and the second stabilized frequency is a grid-tied stabilized frequency corresponding to the second switching frequency.

5. The grid-tied inverter apparatus according to claim 4, wherein the controller is further configured to:
when the switching frequencies of the plurality of power switching transistors are the second switching frequency and the output current value of the grid-tied inverter apparatus is less than a reset current value, increase the switching frequencies of the plurality of power switching transistors to the first switching frequency, to adjust the resonance frequency of the filter circuit to the first resonance frequency through the first resonant branch, wherein the reset current value is less than or equal to the overload current value.

6. The grid-tied inverter apparatus according to claim 1, wherein;
the controller comprises a state determining unit and a drive control unit, and the state determining unit is connected to the inverter circuit through the drive control unit;
the state determining unit is configured to output a first state signal when the output current value of the grid-tied inverter apparatus is less than an overload current value;
the state determining unit is configured to output a second state signal when the output current value of the grid-tied inverter apparatus is greater than or equal to the overload current value; and
the drive control unit is configured to:
control, based on the first state signal, the switching frequencies of the plurality of power switching transistors to be the first switching frequency; or
control, based on the second state signal, the switching frequencies of the plurality of power switching transistors to be the second switching frequency.

7. The grid-tied inverter apparatus according to claim 6, wherein:
the state determining unit is further configured to output a first reset signal when the switching frequencies of the plurality of power switching transistors are the second switching frequency and the output current value of the grid-tied inverter apparatus is less than the reset current value; and
the drive control unit is further configured to control, based on the first reset signal, the switching frequencies of the plurality of power switching transistors to be the first switching frequency.

8. The grid-tied inverter apparatus according to claim 7, wherein one variable filter unit comprises a variable capacitor unit and a variable inductor unit, the variable capacitor unit and the variable inductor unit are connected in series, and a capacitor unit, the variable capacitor unit, and the variable inductor unit meet the following formulas:
$Z11<Z21$, and
$Z12>Z22$, wherein
$Z11$ is an equivalent impedance of the capacitor unit in a case in which a switching frequency is the first switching frequency, $Z21$ is an equivalent impedance of the variable filter unit in a case in which the switching frequency is the first switching frequency, $Z12$ is an equivalent impedance of the capacitor unit in a case in which the switching frequency is the second switching frequency, and $Z22$ is an equivalent impedance of the variable filter unit in a case in which the switching frequency is the second switching frequency.

9. A grid-tied control method, applicable to a grid-tied inverter apparatus, wherein the grid-tied inverter apparatus comprises an inverter circuit, a controller, and a filter circuit, the inverter circuit comprises a plurality of power switching transistors connected in series or in parallel, the filter circuit comprises a plurality of resonant branches that comprise an inductor unit and a plurality of resonant units connected in parallel, one end of the inverter circuit is connected to a direct current power supply, another end of the inverter circuit is connected to a power grid or a load through the filter circuit, the controller is connected to the inverter circuit, and the grid-tied control method comprising:
detecting an output current value of the grid-tied inverter apparatus; and
adjusting switching frequencies of the plurality of power switching transistors based on the output current value of the grid-tied inverter apparatus, to adjust a resonance frequency of the filter circuit through different resonant branches, wherein the resonance frequency meets a grid-tied requirement.

10. The grid-tied control method according to claim 9, wherein the adjusting switching frequencies of the plurality of power switching transistors based on the output current value of the grid-tied inverter apparatus, to adjust a resonance frequency of the filter circuit through different resonant branches comprises:
when the switching frequencies of the plurality of power switching transistors are different, performing resonance through a resonant branch with a lowest equivalent impedance among the plurality of resonant branches, to adjust the resonance frequency of the filter circuit, wherein the controller synchronously changes an equivalent impedance in the plurality of resonant branches when adjusting the switching frequencies of the plurality of power switching transistors.

11. The grid-tied control method according to claim 10, wherein:
the plurality of resonant units comprise a capacitor unit and at least one variable filter unit, the inductor unit comprises a first inductor unit and a second inductor unit, the first inductor unit and the second inductor unit are connected in series between the inverter circuit and the load, the capacitor unit and the variable filter unit are connected in parallel between the first inductor unit and the second inductor unit, the capacitor unit and the inductor unit constitute a first resonant branch, the variable filter unit and the inductor unit constitute a second resonant branch, and
after the detecting an output current value of the grid-tied inverter apparatus, the grid-tied control method further comprises:
when the output current value of the grid-tied inverter apparatus is less than an overload current value, adjusting the switching frequencies of the plurality of power switching transistors to a first switching frequency, to adjust the resonance frequency of the filter circuit to a first resonance frequency through the first resonant branch, wherein an equivalent impedance of the first resonant branch is less than an equivalent impedance of the second resonant branch when a switching frequency is the first switching frequency, the first resonance frequency is less than a first stabilized frequency, and the first stabilized frequency is a grid-tied stabilized frequency corresponding to the first switching frequency.

12. The grid-tied control method according to claim 11, wherein after the detecting an output current value of the grid-tied inverter apparatus, the grid-tied control method further comprises:
when the output current value of the grid-tied inverter apparatus is greater than or equal to the overload current value, reducing the switching frequencies of the plurality of power switching transistors to a second switching frequency, and adjusting the resonance frequency of the filter circuit to a second resonance frequency through the second resonant branch, wherein the second switching frequency is less than the first switching frequency, an equivalent impedance of the second resonant branch is less than an equivalent impedance of the first resonant branch when a switching frequency is the second switching frequency, the second resonance frequency is less than a second stabilized frequency and less than the first resonance frequency, and the second stabilized frequency is a grid-tied stabilized frequency corresponding to the second switching frequency.

13. The grid-tied control method according to claim 12, wherein after the adjusting the resonance frequency of the filter circuit to a second resonance frequency through the second resonant branch, the method further comprises:
when the output current value of the grid-tied inverter apparatus is less than a reset current value, increasing the switching frequencies of the plurality of power switching transistors to the first switching frequency, to adjust the resonance frequency of the filter circuit to the first resonance frequency through the first resonant branch, wherein the reset current value is less than or equal to the overload current value.

14. The grid-tied control method according to claim 10, wherein:
the controller comprises a state determining unit and a drive control unit, and
after the detecting an output current value of the grid-tied inverter apparatus, the grid-tied control method further comprises:
outputting a first state signal when the output current value of the grid-tied inverter apparatus is less than an overload current value;
outputting a second state signal when the output current value of the grid-tied inverter apparatus is greater than or equal to the overload current value; and
controlling, based on the first state signal, the switching frequencies of the plurality of power switching transistors to be the first switching frequency; or
controlling, based on the second state signal, the switching frequencies of the plurality of power switching transistors to be the second switching frequency.

15. The grid-tied control method according to claim 14, wherein after the controlling, based on the second state signal, the switching frequencies of the plurality of power switching transistors to be the second switching frequency, the grid-tied control method further comprises:
outputting a first reset signal when the output current value of the grid-tied inverter apparatus is less than the reset current value; and
controlling, based on the first reset signal, the switching frequencies of the plurality of power switching transistors to be the first switching frequency.

16. The grid-tied control method according to claim 15, wherein one variable filter unit comprises a variable capacitor unit and a variable inductor unit, the variable capacitor unit and the variable inductor unit are connected in series, and a capacitor unit, the variable capacitor unit, and the variable inductor unit meet the following formulas:
$Z11 < Z21$, and
$Z12 > Z22$, wherein
$Z11$ is an equivalent impedance of the capacitor unit in a case in which a switching frequency is the first switching frequency, $Z21$ is an equivalent impedance of the variable filter unit in a case in which the switching frequency is the first switching frequency, $Z12$ is an equivalent impedance of the capacitor unit in a case in which the switching frequency is the second switching frequency, and $Z22$ is an equivalent impedance of the variable filter unit in a case in which the switching frequency is the second switching frequency.

17. A power supply system, comprising:
a power supply;

an inverter apparatus, wherein the inverter apparatus includes an inverter circuit, a controller, and a filter circuit, and wherein:

the inverter circuit includes a plurality of power switching transistors connected in series or in parallel;

the filter circuit includes a plurality of resonant branches that include an inductor unit and a plurality of resonant units connected in parallel, wherein one end of the inverter circuit is connected to a direct current power supply, another end of the inverter circuit is connected to a power grid or a load through the filter circuit; and the controller is connected to the inverter circuit.

18. The power supply system according to claim 17, wherein the power supply system includes a transformer, and the direct current power supply is connected to the inverter apparatus through the transformer.

19. The power supply system according to claim 18, wherein the power supply system includes a combiner box, and the transformer is connected to the inverter apparatus through the combiner box.

20. The power supply system according to claim 19, wherein the power supply system includes a direct current bus, the transformer is connected to the direct current bus through the combiner box, and the direct current bus is connected to the inverter apparatus.

\* \* \* \* \*